(12) United States Patent
Yu et al.

(10) Patent No.: US 11,153,804 B2
(45) Date of Patent: Oct. 19, 2021

(54) RRC MESSAGE TRANSMISSION METHOD AND APPARATUS, TERMINAL DEVICE, AND ACCESS NETWORK DEVICE

(71) Applicant: HUAWEI TECHNOLOGIES CO., LTD., Guangdong (CN)

(72) Inventors: Haifeng Yu, Beijing (CN); Xin Xiong, Beijing (CN); Feng Yu, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 85 days.

(21) Appl. No.: 16/579,632

(22) Filed: Sep. 23, 2019

(65) Prior Publication Data

US 2020/0022060 A1 Jan. 16, 2020

Related U.S. Application Data

(63) Continuation of application No. PCT/CN2018/080059, filed on Mar. 22, 2018.

(30) Foreign Application Priority Data

Mar. 24, 2017 (CN) .......................... 201710183840.X

(51) Int. Cl.
*H04L 5/00* (2006.01)
*H04W 40/24* (2009.01)
(Continued)

(52) U.S. Cl.
CPC ........ *H04W 40/248* (2013.01); *H04B 17/336* (2015.01); *H04L 1/0026* (2013.01);
(Continued)

(58) Field of Classification Search
CPC .................................................. H04L 41/0668
See application file for complete search history.

(56) References Cited

U.S. PATENT DOCUMENTS 10,009,809 B2 * 6/2018 Hahn ................ H04W 74/0833
2011/0222491 A1 9/2011 Vajapeyam et al.
(Continued)

FOREIGN PATENT DOCUMENTS

CN 102884854 A 1/2013
CN 103634839 A 3/2014
(Continued)

OTHER PUBLICATIONS

Nokia, Alcatel-Lucent Shanghai Bell, Control plane architecture for NR-NR multi-connectivity. 3GPP TSG-RAN WG2 Adhoc Spokane, USA, Jan. 17-19, 2017, R2-1700061, 3 pages.
(Continued)

*Primary Examiner* — Fahmida S Chowdhury
(74) *Attorney, Agent, or Firm* — Womble Bond Dickinson (US) LLP

(57) ABSTRACT

A first access network device sends first configuration information to a terminal device, where the first configuration information includes multipath configuration information and a first trigger condition, the multipath configuration information includes configuration information of a plurality of second transmission paths, and each second transmission path includes a transmission link between the terminal device and one second access network device and an interface link between the first access network device and the second access network device. When a radio link between the terminal device and the first access network device meets the first trigger condition, the terminal device activates the multipath configuration information, and transmits a same RRC message to the first access network device by using a first transmission path and at least one second target transmission path. Accordingly, a same RRC message is transmitted by using a plurality of transmission paths, thereby improving RRC message reliability.

20 Claims, 9 Drawing Sheets

(51) Int. Cl.
*H04B 17/336* (2015.01)
*H04W 76/27* (2018.01)
*H04L 1/00* (2006.01)
*H04L 1/18* (2006.01)
*H04W 40/12* (2009.01)

(52) U.S. Cl.
CPC .......... *H04L 1/1819* (2013.01); *H04L 5/0055* (2013.01); *H04W 40/12* (2013.01); *H04W 76/27* (2018.02)

(56) References Cited

U.S. PATENT DOCUMENTS

| | | | | |
|---|---|---|---|---|
| 2014/0056243 | A1* | 2/2014 | Pelletier | H04W 72/1263 370/329 |
| 2014/0080484 | A1* | 3/2014 | Centonza | H04W 36/0072 455/436 |
| 2015/0302123 | A1* | 10/2015 | Gloss | H04W 16/30 703/13 |
| 2017/0013519 | A1* | 1/2017 | Hahn | H04W 36/14 |
| 2017/0086093 | A1 | 3/2017 | Chen et al. | |
| 2017/0215201 | A1* | 7/2017 | Kim | H04L 1/1812 |
| 2018/0279403 | A1 | 9/2018 | Kim | |

FOREIGN PATENT DOCUMENTS

| | | |
|---|---|---|
| CN | 104918232 A | 9/2015 |
| CN | 105519167 A | 4/2016 |
| WO | 2016105472 A2 | 6/2016 |
| WO | 2017034449 A1 | 3/2017 |

OTHER PUBLICATIONS

Huawei, HiSilicon:"RRC Architecture and its Signalling Transmission", 3GPP TSG-RAN WG2 Meeting #95, R2-165025, Gothenburg, Sweden, Aug. 22-26, 2016, total 4 pages.

3GPP TR 38.913 V14.1.0 (Dec. 2016);3rd Generation Partnership Project;Technical Specification Group Radio Access Network;Study on Scenarios and Requirements for Next Generation Access Technologies;(Release 14);total 38 pages.

Huawei, HiSilicon:"RRC Architecture and its Signalling Transmission", 3GPP TSG-RAN WG2 Meeting Ad hoc, R2-1700096, Spokane, USA, Jan. 16-20, 2017. total 4 pages.

* cited by examiner

RRC MESSAGE TRANSMISSION METHOD AND APPARATUS, TERMINAL DEVICE, AND ACCESS NETWORK DEVICE

CROSS-REFERENCE TO RELATED APPLICATIONS

This application is a continuation of International Application No. PCT/CN2018/080059, filed on Mar. 22, 2018, which claims priority to Chinese Patent Application No. 201710183840.X, filed on Mar. 24, 2017. The disclosures of the aforementioned applications are hereby incorporated by reference in their entireties.

TECHNICAL FIELD

This disclosure relates to the field of wireless communications technologies, and in particular, to an RRC message transmission method and apparatus, a terminal device, and an access network device.

BACKGROUND

In a wireless communications system such as long term evolution (LTE), long term evolution advanced (LTE-Advanced, LTE-A), or a fifth generation (5G) mobile communications technology, especially in the 5G wireless communications system, a mobile Internet and a mobile Internet of things become main driving forces for future communication development, and have a great impact on fields such as living, work, leisure, and transportation of people. Therefore, in the 5G wireless communications system, service requirements are diversified. Currently, main application scenarios of the 5G wireless communications system include: enhanced mobile broadband (eMBB), massive machine type communication (mMTC), and ultra-reliable and low latency communications (URLLC). The eMBB, the mMTC, and the URLLC each have a very high requirement on RRC message transmission reliability, and especially, the URLLC has an extremely high requirement on RRC message transmission reliability. Therefore, in the 5G wireless communications system, how to transmit an RRC message is a focus of attention in the industry.

Currently, to resolve a mobility problem of a terminal device and provide higher bandwidth for the terminal device, dual connectivity (DC) may be established between the terminal device and a base station, that is, the terminal device accesses two base stations at the same time, so that the two base stations can serve the terminal device at the same time. The two base stations are respectively referred to as a master base station and a secondary base station based on roles of the two base stations. When the terminal device transmits a radio resource control (RRC) message to the master base station, the terminal device transmits the RRC message to the secondary base station. The secondary base station receives the RRC message sent by the terminal device, and forwards the RRC message to the master base station.

When a condition of a radio link between the terminal device and the secondary base station is relatively poor, or a condition of a radio link between the secondary base station and the master base station is relatively poor, the terminal device fails to transmit the RRC message to the master base station, and consequently reliability of the foregoing RRC message transmission is poor.

SUMMARY

Embodiments of this disclosure provide an RRC message transmission method and apparatus, a terminal device, and an access network device, to resolve a problem that RRC message transmission reliability is poor in related technologies. The technical solutions are as follows:

According to a first aspect, an embodiment of this disclosure provides an RRC message transmission method, where the method includes:

receiving, by a terminal device, first configuration information sent by a first access network device by using a first transmission path, where the first configuration information includes multipath configuration information and a first trigger condition, the multipath configuration information includes configuration information of a plurality of second transmission paths, each second transmission path includes a transmission link between the terminal device and one second access network device and an interface link between the first access network device and the second access network device, and a second access network device on one second transmission path is different from a second access network device on another second transmission path; and when a radio link between the terminal device and the first access network device meets the first trigger condition, activating, by the terminal device, the multipath configuration information, and transmitting a same radio resource control RRC message to the first access network device by using the first transmission path and at least one second target transmission path in the plurality of second transmission paths, where the RRC message is generated by the terminal device.

In this embodiment of this disclosure, the terminal device receives the multipath configuration information and the first trigger condition that are sent by the first access network device. When the terminal device detects that the radio link between the terminal device and the first access network device meets the first trigger condition, the terminal device activates the multipath configuration information, and transmits the same RRC message to the first access network device by using the first transmission path and the at least one second target transmission path. Because the same RRC message is transmitted to the first access network device by using a plurality of transmission paths, RRC message reliability is improved.

In one embodiment, the first trigger condition includes at least one of the following conditions:

reference signal received power RSRP that is measured by the terminal device and that is between the terminal device and the first access network device is not greater than a first preset value;

reference signal received quality RSRQ that is measured by the terminal device and that is between the terminal device and the first access network device is not greater than a second preset value;

a channel quality indicator CQI that is measured by the terminal device and that is of the radio link between the terminal device and the first access network device is not greater than a third preset value;

a signal to interference plus noise ratio SINR measured by the terminal device is not greater than a fourth preset value;

a signal-to-noise ratio SNR measured by the terminal device is not greater than a fifth preset value;

a quantity of hybrid automatic repeat request HARQ negative acknowledgements NACKs obtained by the terminal device through statistics collection is greater than a sixth preset value; and a quantity of automatic repeat request ARQ negative acknowledgements NACKs obtained by the terminal device through statistics collection is greater than a seventh preset value.

In this embodiment of this disclosure, the first trigger condition is any threshold that represents quality of the radio link, thereby enriching a trigger condition for triggering transmission of a same RRC message between the terminal device and the first access network device.

In one embodiment, the method further includes:

receiving, by the terminal device, multipath instruction information sent by the first access network device; and performing, by the terminal device based on the multipath instruction information, the operation of activating the multipath configuration information, and transmitting a same radio resource control RRC message to the first access network device by using the first transmission path and at least one second target transmission path in the plurality of second transmission paths.

In this embodiment of this disclosure, the first access network device instructs, by using the multipath instruction information, the terminal device to transmit the same RRC message to the first access network device by using a plurality of transmission paths, so that the first access network device can flexibly control a transmission manner of the terminal device.

In one embodiment, the activating, by the terminal device, the multipath configuration information, and transmitting a same radio resource control RRC message to the first access network device by using the first transmission path and at least one second target transmission path in the plurality of second transmission paths includes:

selecting, by the terminal device, configuration information of the at least one second target transmission path from the multipath configuration information;

establishing, by the terminal device, a second target transmission path with each second target access network device based on configuration information of each second target transmission path; and transmitting, by the terminal device, the RRC message to the first access network device by using the first transmission path, and transmitting the same RRC message to each second target access network device by using each second target transmission path, where the RRC message is used by each second target access network device to forward the same RRC message to the first access network device by using each target interface link.

In this embodiment of this disclosure, the terminal device selects the configuration information of the second target transmission path from the multipath configuration information, thereby avoiding RRC message exchange between the first access network device and each of the terminal device and the second target access network device. This not only reduces RRC message overheads, but also improves efficiency of obtaining the configuration information of the second target transmission path, thereby improving RRC message transmission efficiency.

In one embodiment, the selecting, by the terminal device, configuration information of the at least one second target transmission path from the multipath configuration information includes:

obtaining, by the terminal device, a transmission requirement of the terminal device, where the transmission requirement includes at least one of a transmission data volume, a feedback mechanism, and a quality requirement;

determining, by the terminal device based on the transmission requirement, a quantity of second access network devices required by the terminal device; and selecting, by the terminal device, configuration information of second target access network devices of the quantity from the multipath configuration information. In this embodiment of this disclosure, the terminal device determines, based on the transmission requirement, the quantity of second access network devices required by the terminal device, and selects the configuration information of the second target access network devices of the quantity from the multipath configuration information, so that the configuration information of the second target access network device can be selected as required, thereby improving utilization of the second target access network device.

In one embodiment, the selecting, by the terminal device, configuration information of second target access network devices of the quantity from the multipath configuration information includes:

determining, by the terminal device, transmission quality of each second access network device in the multipath configuration information; and selecting, by the terminal device from the multipath configuration information based on the transmission quality of each second access network device in the multipath configuration information, configuration information of second target access network devices that are of the quantity and that have best transmission quality.

In this embodiment of this disclosure, the terminal device selects, based on the transmission quality of each second access network device, configuration information of a second target access network device that has best transmission quality, and transmits the same RRC message to the first access network device by using the second target access network device that has best transmission quality, thereby improving transmission efficiency.

In one embodiment, the selecting, by the terminal device, configuration information of the at least one second target transmission path from the multipath configuration information includes:

receiving, by the terminal device, a path identifier that is of each second target transmission path and that is sent by the first access network device; and selecting, by the terminal device, configuration information of each second target transmission path from the multipath configuration information based on the path identifier of the second target transmission path.

In this embodiment of this disclosure, the first access network device indicates a path identifier of a to-be-selected second target transmission path to the terminal device, so that not only the first access network device can effectively control the terminal device, but also a time for the terminal device to determine each second target transmission path is reduced, thereby improving efficiency of selecting configuration information of each second target transmission path.

In one embodiment, the method further includes:

receiving, by the terminal device, adjustment indication information sent by the first access network device, where the adjustment indication information includes updated configuration information of a second transmission path; and updating, by the terminal device, the stored multipath configuration information based on the adjustment indication information.

In this embodiment of this disclosure, the terminal device updates, based on the adjustment indication information, the multipath configuration information stored in the terminal device, so that the multipath configuration information can be updated in a timely manner.

In one embodiment, the receiving, by the terminal device, adjustment indication information sent by the first access network device includes:

receiving, by the terminal device, control information sent by the first access network device, where the control information includes the adjustment indication information, and the control information is a physical downlink control channel PDCCH, a media access control control element MAC CE, or an RRC connection reconfiguration message.

In this embodiment of this disclosure, the PDCCH, the MAC CE, or the RRC connection reconfiguration message is used to carry the adjustment indication information, thereby improving adjustment flexibility. In addition, the PDCCH or the MAC CE is used to carry the adjustment indication information, so that not only an RRC reconfiguration transmission latency is reduced, but also overheads of the RRC reconfiguration message are reduced.

According to a second aspect, an embodiment of this disclosure provides an RRC message transmission method, where the method includes:

sending, by a first access network device, first configuration information to a terminal device by using a first transmission path, where the first configuration information includes multipath configuration information and a first trigger condition, the multipath configuration information includes configuration information of second transmission paths, each second transmission path includes a transmission link between the terminal device and one second access network device and an interface link between the first access network device and the second access network device, and a second access network device on one second transmission path is different from a second access network device on another second transmission path; and receiving, by the first access network device, a radio resource control RRC message transmitted by the terminal device by using the first transmission path, and receiving the same RRC message transmitted by at least one second target access network device by using at least one target interface link, where the RRC message is generated by the terminal device, and the RRC message is sent by the terminal device when it is determined that a radio link between the terminal device and the first access network device meets the first trigger condition.

In this embodiment of this disclosure, the first access network device sends the multipath configuration information and the first trigger condition to the terminal device. When the terminal device detects that the radio link between the terminal device and the first access network device meets the first trigger condition, the terminal device activates the multipath configuration information, and transmits the same RRC message to the first access network device by using the first transmission path and at least one second target transmission path. Because the first access network device receives, by using a plurality of transmission paths, the same RRC message sent by the terminal device, RRC message reliability is improved.

In one embodiment, after the sending, by a first access network device, first configuration information to a terminal device by using a first transmission path, the method further includes:

obtaining, by the first access network device, status information of the first access network device, where the status information includes at least one type of remaining-resource information, load information, and quality information; and when the status information meets a second trigger condition, sending, by the first access network device, multipath instruction information to the terminal device, where the multipath instruction information is used to instruct the terminal device to transmit the same RRC message to the first access network device by using the first transmission path and at least one second target transmission path.

In this embodiment of this disclosure, the first access network device may determine whether the at least one type of the remaining-resource information, the load information, and the quality information meets the second trigger condition, and send the multipath instruction information to the terminal device when the at least one type of the remaining-resource information, the load information, and the quality information meets the second trigger condition, to instruct the terminal device to transmit the same RRC message to the first access network device by using a plurality of transmission paths, so that the first access network device can flexibly control a transmission manner of the terminal device.

In one embodiment, when the status information meets the second trigger condition, the method further includes:

sending, by the first access network device, a path identifier of each second target transmission path to the terminal device, where the path identifier of each second target transmission path is used by the terminal device to select configuration information of the second target transmission path from the multipath configuration information.

In this embodiment of this disclosure, the first access network device indicates a path identifier of a to-be-selected second target transmission path to the terminal device, so that not only the first access network device can effectively control the terminal device, but also a time for the terminal device to determine each second target transmission path is reduced, thereby improving efficiency of selecting configuration information of each second target transmission path.

In one embodiment, the method further includes:

sending, by the first access network device, adjustment indication information to the terminal device, where the adjustment indication information includes updated configuration information of a second transmission path, and the adjustment indication information is used by the terminal device to update the stored multipath configuration information based on the adjustment indication information.

In this embodiment of this disclosure, the access network device may update, by using the adjustment indication information, the multipath configuration information stored in the terminal device, so that the multipath configuration information can be updated in a timely manner.

In one embodiment, the sending, by the first access network device, adjustment indication information to the terminal device includes:

sending, by the first access network device, control information to the terminal device, where the control information includes the adjustment indication information, and the control information is a physical downlink control channel PDCCH, a media access control control element MAC CE, or an RRC connection reconfiguration message.

In this embodiment of this disclosure, the PDCCH, the MAC CE, or the RRC connection reconfiguration message is used to carry the adjustment indication information, thereby improving adjustment flexibility. In addition, the PDCCH or the MAC CE is used to carry the adjustment indication information, so that not only an RRC reconfiguration transmission latency is reduced, but also overheads of the RRC reconfiguration message are reduced.

According to a third aspect, an embodiment of this disclosure provides an RRC message transmission apparatus, where the apparatus includes:

a transceiver unit, configured to receive first configuration information sent by a first access network device by using a first transmission path, where the first configuration information includes multipath configuration information and a first trigger condition, the multipath configuration information includes configuration information of a plurality of second transmission paths, each second transmission path includes a transmission link between a terminal device and one second access network device and an interface link between the first access network device and the second access network device, and a second access network device on one second transmission path is different from a second access network device on another second transmission path; and a processing unit, configured to: when a radio link between the terminal device and the first access network device meets the first trigger condition, activate the multipath configuration information, and control the transceiver unit to transmit a same radio resource control RRC message to the first access network device by using the first transmission path and at least one second target transmission path in the plurality of second transmission paths, where the RRC message is generated by the terminal device.

In one embodiment, the first trigger condition includes at least one of the following conditions:

reference signal received power RSRP that is measured by the terminal device and that is between the terminal device and the first access network device is not greater than a first preset value;

reference signal received quality RSRQ that is measured by the terminal device and that is between the terminal device and the first access network device is not greater than a second preset value;

a channel quality indicator CQI that is measured by the terminal device and that is of the radio link between the terminal device and the first access network device is not greater than a third preset value;

a signal to interference plus noise ratio SINR measured by the terminal device is not greater than a fourth preset value;

a signal-to-noise ratio SNR measured by the terminal device is not greater than a fifth preset value;

a quantity of hybrid automatic repeat request HARQ negative acknowledgements NACKs obtained by the terminal device through statistics collection is greater than a sixth preset value; and a quantity of automatic repeat request ARQ negative acknowledgements NACKs obtained by the terminal device through statistics collection is greater than a seventh preset value.

In one embodiment, the transceiver unit is further configured to receive multipath instruction information sent by the first access network device; and the processing unit is further configured to perform, based on the multipath instruction information, the operation of activating the multipath configuration information, and controlling the transceiver unit to transmit a same radio resource control RRC message to the first access network device by using the first transmission path and at least one second target transmission path in the plurality of second transmission paths.

In one embodiment, the processing unit is further configured to select configuration information of the at least one second target transmission path from the multipath configuration information;

the processing unit is further configured to establish a second target transmission path with each second target access network device based on configuration information of each second target transmission path; and the transceiver unit is further configured to: transmit the RRC message to the first access network device by using the first transmission path, and transmit the same RRC message to each second target access network device by using each second target transmission path, where the RRC message is used by each second target access network device to forward the same RRC message to the first access network device by using each target interface link.

In one embodiment, the processing unit is further configured to: obtain a transmission requirement of the terminal device, where the transmission requirement includes at least one of a transmission data volume, a feedback mechanism, and a quality requirement; determine, based on the transmission requirement, a quantity of second access network devices required by the terminal device; and select configuration information of second target access network devices of the quantity from the multipath configuration information.

In one embodiment, the processing unit is further configured to: determine transmission quality of each second access network device in the multipath configuration information, and select, from the multipath configuration information based on the transmission quality of each second access network device in the multipath configuration information, configuration information of second target access network devices that are of the quantity and that have best transmission quality.

In one embodiment, the transceiver unit is further configured to receive a path identifier that is of each second target transmission path and that is sent by the first access network device; and the processing unit is further configured to select configuration information of each second target transmission path from the multipath configuration information based on the path identifier of the second target transmission path.

In one embodiment, the apparatus further includes:

the transceiver unit is further configured to receive adjustment indication information sent by the first access network device, where the adjustment indication information includes updated configuration information of a second transmission path; and the processing unit is further configured to update the stored multipath configuration information based on the adjustment indication information.

In one embodiment, the transceiver unit is further configured to receive control information sent by the first access network device, where the control information includes the adjustment indication information, and the control information is a physical downlink control channel PDCCH, a media access control control element MAC CE, or an RRC connection reconfiguration message.

According to a fourth aspect, an embodiment of this disclosure provides an RRC message transmission apparatus, where the apparatus includes:

a processing unit, configured to determine first configuration information, where the first configuration information includes multipath configuration information and a first trigger condition, the multipath configuration information includes configuration information of a plurality of second transmission paths, each second transmission path includes a transmission link between the terminal device and one second access network device and an interface link between a first access network device and the second access network device, and a second access network device on one second transmission path is different from a second access network device on another second transmission path; and a transceiver unit, configured to send the first configuration information to the terminal device by using a first transmission path, where the transceiver unit is further configured to: receive a radio resource control RRC message transmitted by the terminal device by using the first transmission path, and receive the same RRC message transmitted by at least one second target access network device by using at least one target interface link, where the RRC message is generated by the terminal device, and the RRC message is sent by the terminal device when it is determined that a radio link between the terminal device and the first access network device meets the first trigger condition.

In one embodiment, the apparatus further includes:

the processing unit is further configured to obtain status information of the first access network device, where the status information includes at least one type of remaining-resource information, load information, and quality information; and the transceiver unit is further configured to: when the status information meets a second trigger condition, send multipath instruction information to the terminal device, where the multipath instruction information is used to instruct the terminal device to transmit the same RRC message to the first access network device by using the first transmission path and at least one second target transmission path.

In one embodiment, the transceiver unit is further configured to: when the status information meets the second trigger condition, send a path identifier of each second target transmission path to the terminal device, where the path identifier of each second target transmission path is used by the terminal device to select configuration information of the second target transmission path from the multipath configuration information.

In one embodiment, the transceiver unit is further configured to send adjustment indication information to the terminal device, where the adjustment indication information includes updated configuration information of a second transmission path, and the adjustment indication information is used by the terminal device to update the stored multipath configuration information based on the adjustment indication information.

In one embodiment, the transceiver unit is further configured to send control information to the terminal device, where the control information includes the adjustment indication information, and the control information is a physical downlink control channel PDCCH, a media access control control element MAC CE, or an RRC connection reconfiguration message.

According to a fifth aspect, an embodiment of this disclosure provides a terminal device, where the terminal device includes:

a transceiver, configured to receive first configuration information sent by a first access network device by using a first transmission path, where the first configuration information includes multipath configuration information and a first trigger condition, the multipath configuration information includes configuration information of a plurality of second transmission paths, each second transmission path includes a transmission link between the terminal device and one second access network device and an interface link between the first access network device and the second access network device, and a second access network device on one second transmission path is different from a second access network device on another second transmission path; and a processor, configured to: when a radio link between the terminal device and the first access network device meets the first trigger condition, activate, by the terminal device, the multipath configuration information, and transmit a same radio resource control RRC message to the first access network device by using the first transmission path and at least one second target transmission path in the plurality of second transmission paths, where the RRC message is generated by the terminal device.

In one embodiment, the first trigger condition includes at least one of the following conditions:

reference signal received power RSRP that is measured by the terminal device and that is between the terminal device and the first access network device is not greater than a first preset value;

reference signal received quality RSRQ that is measured by the terminal device and that is between the terminal device and the first access network device is not greater than a second preset value;

a channel quality indicator CQI that is measured by the terminal device and that is of the radio link between the terminal device and the first access network device is not greater than a third preset value;

a signal to interference plus noise ratio SINR measured by the terminal device is not greater than a fourth preset value;

a signal-to-noise ratio SNR measured by the terminal device is not greater than a fifth preset value;

a quantity of hybrid automatic repeat request HARQ negative acknowledgements NACKs obtained by the terminal device through statistics collection is greater than a sixth preset value; and a quantity of automatic repeat request ARQ negative acknowledgements NACKs obtained by the terminal device through statistics collection is greater than a seventh preset value.

In one embodiment, the transceiver is further configured to receive multipath instruction information sent by the first access network device; and the transceiver is further configured to perform, based on the multipath instruction information, the operation of activating the multipath configuration information, and transmitting a same radio resource control RRC message to the first access network device by using the first transmission path and at least one second target transmission path in the plurality of second transmission paths.

In one embodiment, the processor is configured to select configuration information of the at least one second target transmission path from the multipath configuration information;

the processor is further configured to establish a second target transmission path with each second target access network device based on configuration information of each second target transmission path; and the transceiver is further configured to: transmit the RRC message to the first access network device by using the first transmission path, and transmit the same RRC message to each second target access network device by using each second target transmission path, where the RRC message is used by each second target access network device to forward the same RRC message to the first access network device by using each target interface link.

In one embodiment, the processor is further configured to: obtain a transmission requirement of the terminal device, where the transmission requirement includes at least one of a transmission data volume, a feedback mechanism, and a quality requirement; determine, based on the transmission requirement, a quantity of second access network devices required by the terminal device; and select configuration information of second target access network devices of the quantity from the multipath configuration information.

In one embodiment, the processor is further configured to: determine transmission quality of each second access network device in the multipath configuration information, and select, from the multipath configuration information based on the transmission quality of each second access network device in the multipath configuration information, configuration information of second target access network devices that are of the quantity and that have best transmission quality. In one embodiment, the transceiver is further configured to receive a path identifier that is of each second target transmission path and that is sent by the first access network device; and the processor is further configured to select configuration information of each second target transmission path from the multipath configuration information based on the path identifier of the second target transmission path.

In one embodiment, the transceiver is further configured to receive adjustment indication information sent by the first access network device, where the adjustment indication information includes updated configuration information of a second transmission path; and the processor is further configured to update the stored multipath configuration information based on the adjustment indication information.

In one embodiment, the transceiver is further configured to receive control information sent by the first access network device, where the control information includes the adjustment indication information, and the control information is a physical downlink control channel PDCCH, a media access control control element MAC CE, or an RRC connection reconfiguration message.

According to a sixth aspect, an embodiment of this disclosure provides an access network device, where the access network device includes:

a processor, configured to determine first configuration information, where the first configuration information includes multipath configuration information and a first trigger condition, the multipath configuration information includes configuration information of a plurality of second transmission paths, each second transmission path includes a transmission link between the terminal device and one second access network device and an interface link between a first access network device and the second access network device, and a second access network device on one second transmission path is different from a second access network device on another second transmission path; and a transceiver, configured to send the first configuration information to the terminal device by using a first transmission path, where the transceiver is further configured to: receive a radio resource control RRC message transmitted by the terminal device by using the first transmission path, and receive the same RRC message transmitted by at least one second target access network device by using at least one target interface link, where the RRC message is generated by the terminal device, and the RRC message is sent by the terminal device when it is determined that a radio link between the terminal device and the first access network device meets the first trigger condition.

In one embodiment, the processor is further configured to obtain status information of the first access network device, where the status information includes at least one type of remaining-resource information, load information, and quality information; and the transceiver is further configured to: when the status information meets a second trigger condition, send multipath instruction information to the terminal device, where the multipath instruction information is used to instruct the terminal device to transmit the same RRC message to the first access network device by using the first transmission path and at least one second target transmission path.

In one embodiment, the transceiver is further configured to: when the status information meets the second trigger condition, send a path identifier of each second target transmission path to the terminal device, where the path identifier of each second target transmission path is used by the terminal device to select configuration information of the second target transmission path from the multipath configuration information.

In one embodiment, the transceiver is further configured to send adjustment indication information to the terminal device, where the adjustment indication information includes updated configuration information of a second transmission path, and the adjustment indication information is used by the terminal device to update the stored multipath configuration information based on the adjustment indication information.

In one embodiment, the transceiver is further configured to send control information to the terminal device, where the control information includes the adjustment indication information, and the control information is a physical downlink control channel PDCCH, a media access control control element MAC CE, or an RRC connection reconfiguration message.

According to a seventh aspect, an embodiment of this disclosure provides a system chip, applied to a terminal device. The chip includes an input/output interface, at least one processor, a memory, and a bus. The input/output interface is connected to the at least one processor and the memory by using the bus. The input/output interface is used by the terminal device to communicate with an access network device. The at least one processor executes an instruction stored in the memory, so that the terminal device performs the RRC message transmission method provided in any one of the first aspect or the possible implementations of the first aspect.

According to an eighth aspect, an embodiment of this disclosure provides a system chip, applied to an access network device. The chip includes an input/output interface, at least one processor, a memory, and a bus. The input/output interface is connected to the at least one processor and the memory by using the bus. The input/output interface is used by the access network device to communicate with a terminal device. The at least one processor executes an instruction stored in the memory, so that the access network device performs the RRC message transmission method provided in any one of the second aspect or the possible implementations of the second aspect.

According to a ninth aspect, an embodiment of this disclosure provides a computer storage medium, configured to store a computer software instruction used by a terminal device, where the computer storage medium includes a program designed for the terminal device to execute the foregoing aspects.

According to a tenth aspect, an embodiment of this disclosure provides a computer storage medium, configured to store a computer software instruction used by a first access network device, where the computer storage medium includes a program designed for the first access network device to execute the foregoing aspects.

Technical effects obtained in the second to the tenth aspects of the foregoing embodiments of this disclosure are similar to those obtained by using corresponding technical means in the first aspect, and details are not described herein again.

The technical solutions provided in the embodiments of this disclosure bring the following beneficial effects: In the embodiments of this disclosure, the terminal device receives the multipath configuration information and the first trigger condition that are sent by the first access network device. When the terminal device detects that the radio link between the terminal device and the first access network device meets the first trigger condition, the terminal device activates the multipath configuration information, and transmits the same RRC message to the first access network device by using the first transmission path and the at least one second target transmission path. Because the same RRC message is transmitted to the first access network device by using a plurality of transmission paths, RRC message reliability is improved.

DESCRIPTION OF EMBODIMENTS

The following further describes implementations of this disclosure in detail with reference to the accompanying drawings.

Figure 1:
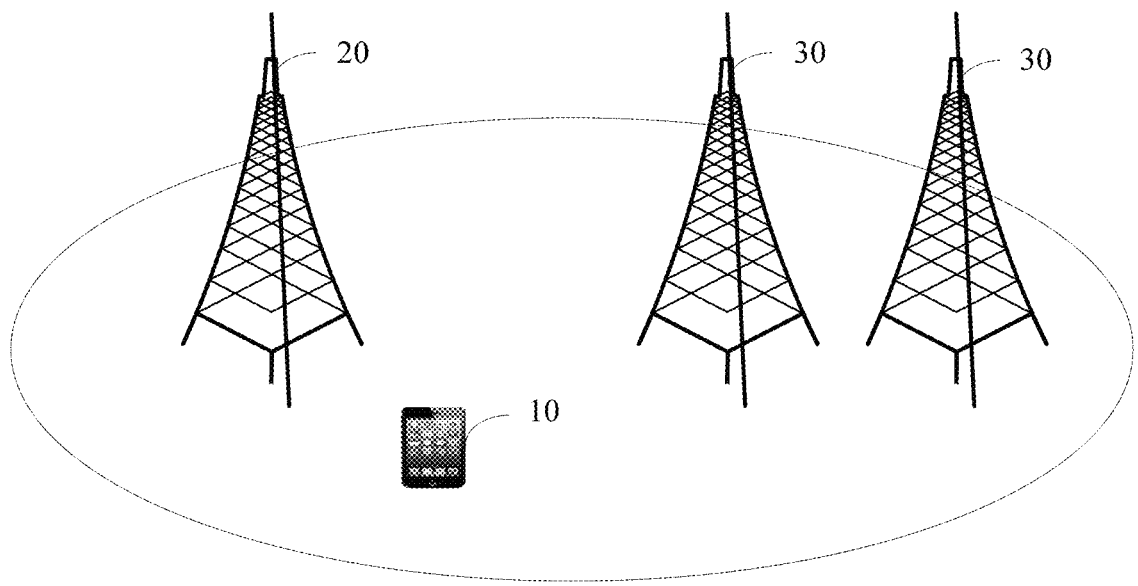
FIG. 1 is a structural diagram of an RRC message transmission system according to an embodiment of this disclosure.

Referring to FIG. 1, an embodiment of this disclosure provides a system architecture for transmitting an RRC message. The system architecture includes a terminal device 10, a first access network device 20, and a plurality of second access network devices 30. A first transmission path is established between the terminal device 10 and the first access network device 20. An interface link is established between the first access network device 20 and each second access network device 30. The interface link may be an X2 interface link.

The first access network device 20 obtains first configuration information. The first configuration information includes multipath configuration information and a first trigger condition. The multipath configuration information includes configuration information of a plurality of second transmission paths. Each second transmission path includes a transmission link between the terminal device 10 and one second access network device 30 and an interface link between the first access network device 20 and each second access network device 30. A second access network device on one second transmission path is different from a second access network device on another second transmission path. Configuration information of a second transmission path includes one or more of a device identifier of a second access network device 30, configuration information of the second access network device 30, resource indication information corresponding to a transmission path established between the terminal device 10 and the second access network device 30, and shared context indication information. The first access network device 20 sends the first configuration information to the terminal device 10. The terminal device 10 receives the first configuration information sent by the first access network device 20, and stores the first configuration information.

RRC message transmission provided in this embodiment of this disclosure is applicable to a case in which the terminal device 10 transmits an RRC message to the first access network device 20 in an uplink, and is also applicable to a case in which the first access network device 20 transmits an RRC message to the terminal device 10 in a downlink. In addition, the terminal device 10 may actively activate the multipath configuration information, and transmit a same RRC message to the first access network device 20 through multipath transmission, or the first access network device 20 may instruct the terminal device 10 to activate the multipath configuration information and transmit a same RRC message to the first access network device 20 through multipath transmission. Multipath transmission means transmitting a same message to a same receiving device by using a plurality of transmission paths. In case of uplink transmission, the RRC message is generated by the terminal device 10. In case of downlink transmission, the RRC message is generated by the first access network device 20.

When the terminal device 10 actively activates the multipath configuration information, the terminal device 10 detects quality of a radio link between the terminal device 10 and the first access network device 20. When detecting that the quality of the radio link between the terminal device 10 and the first access network device 20 is relatively poor, the terminal device 10 activates the multipath configuration information. When the first access network device 20 instructs the terminal device 10 to activate the multipath configuration information, the first access network device 20 may instruct, in case of a relatively small quantity of remaining resources, relatively high load, or relatively poor quality of a radio link between the first access network device 20 and the terminal device 10, the terminal device 10 to activate the multipath configuration information.

This embodiment of this disclosure is mainly applied to a wireless communications system such as LTE, LTE-A, or 5G, and is mainly applied to a high frequency (high frequency) cell, URLLC, or another communication scenario in which a relatively high requirement for RRC message reliability exists in the wireless communications system.

The terminal device 10 may be user equipment (UE), and the access network device may be a base station, a mobility management entity (MME), a serving gateway (S-GW), or the like. In this embodiment of this disclosure, that the access network device is a base station is used as an example for description. In this case, the first access network device 20 may be a master base station, and the second access network device 30 is a secondary base station.

Figure 2:
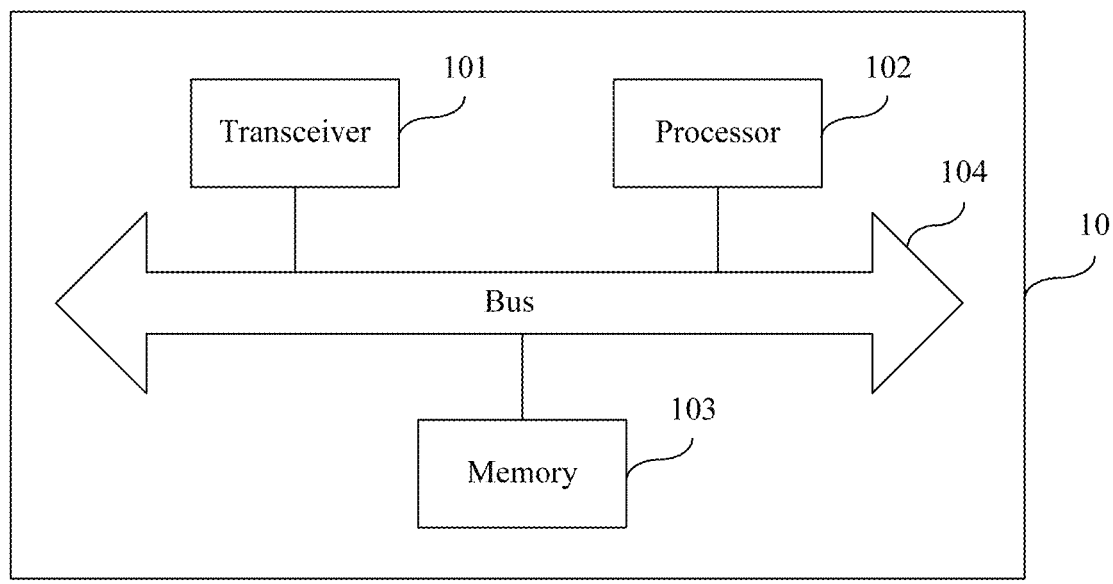
FIG. 2 is a schematic structural diagram of a terminal device according to an embodiment of this disclosure.

Referring to FIG. 2, an embodiment of this disclosure provides a terminal device 10. The terminal device 10 includes a transceiver 101, a processor 102, a memory 103, and a bus 104. The transceiver 101, the processor 102, and the memory 103 communicate with each other by using the bus 104. The transceiver 101 is used by the terminal device 10 to separately communicate with a first access network device 20 and a second access network device. The memory 103 is configured to store first configuration information and an instruction. The instruction includes a computer operation instruction. The processor 102 executes the instruction stored in the memory 103, so that the terminal device 10 performs the following RRC message transmission method.

Figure 3:
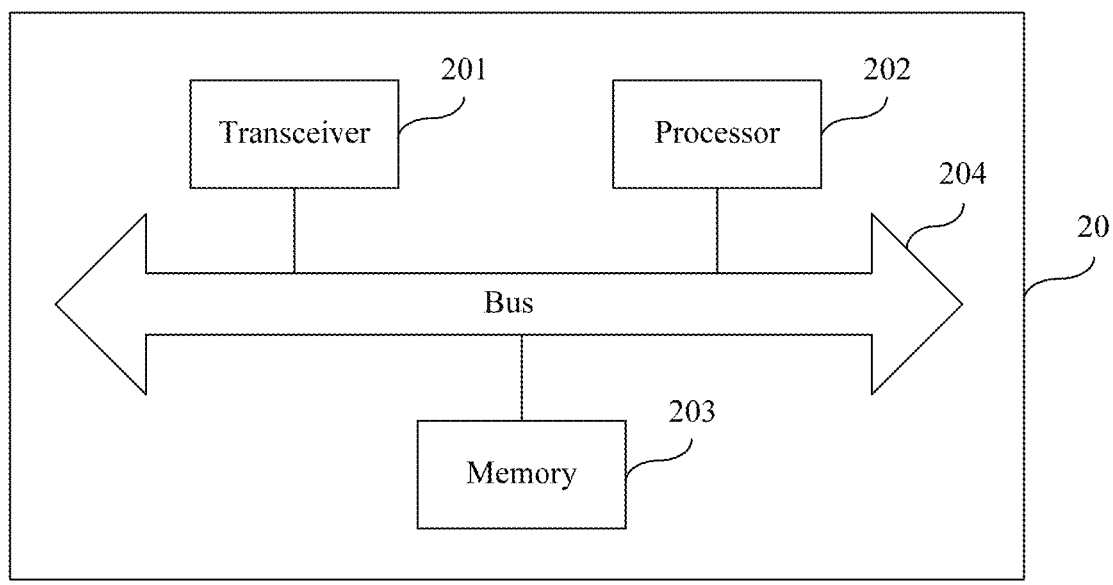
FIG. 3 is a schematic structural diagram of a first access network device according to an embodiment of this disclosure.

Referring to FIG. 3, an embodiment of this disclosure provides a first access network device 20. The first access network device 20 includes a transceiver 201, a processor 202, a memory 203, and a bus 204. The transceiver 201, the processor 202, and the memory 203 communicate with each other by using the bus 204. The transceiver 201 is used by the first access network device 20 to separately communicate with a terminal device 10 and a second access network device. The memory 203 is configured to store an instruction. The instruction includes a computer operation instruction. The processor 202 executes the instruction stored in the memory 203, so that the first access network device 20 performs the following RRC message transmission method.

Figure 4:
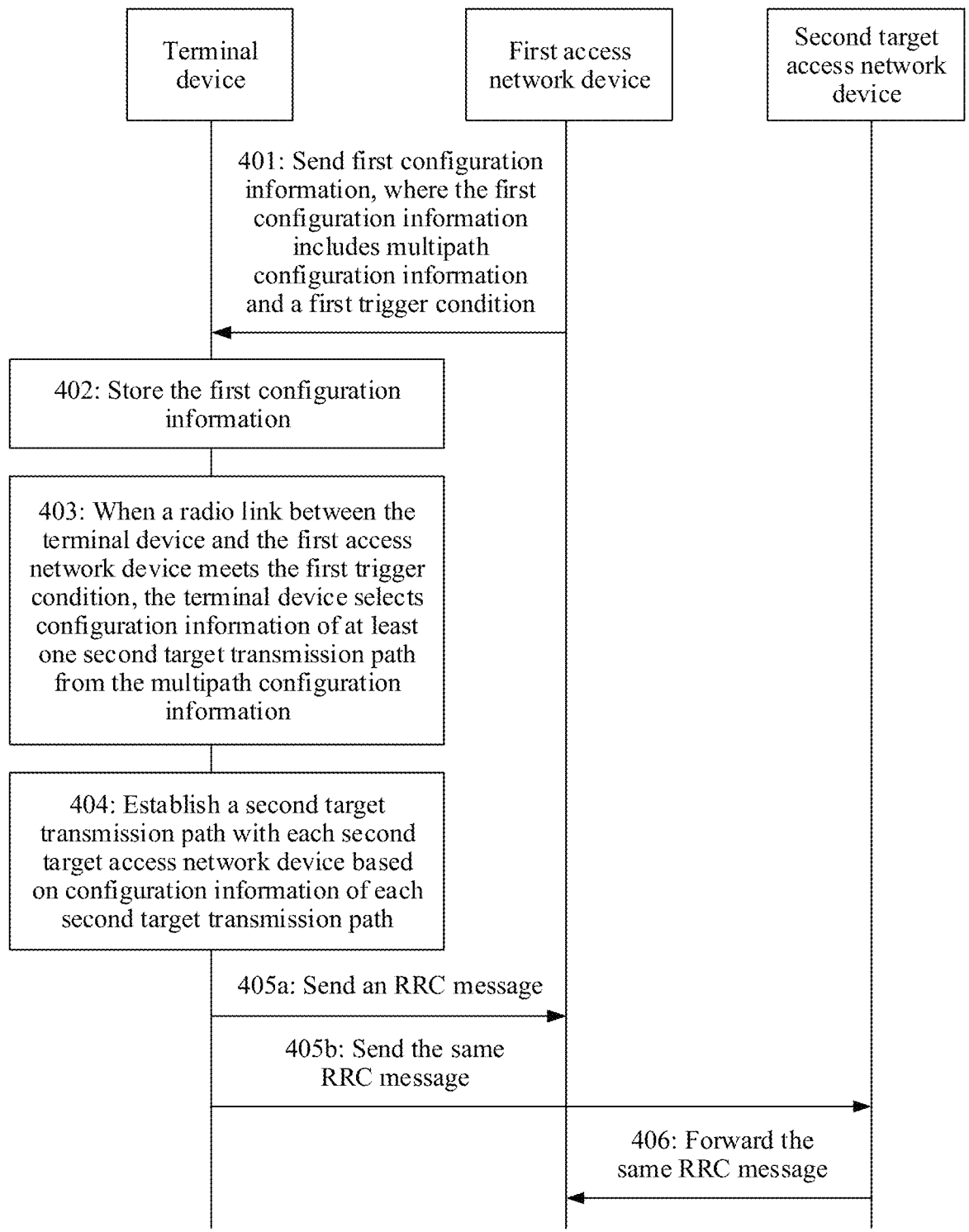
FIG. 4 is a signaling interaction diagram of RRC message transmission according to an embodiment of this disclosure.

An embodiment of this disclosure provides an RRC message transmission method. In this embodiment of this disclosure, the following example is used for description: An RRC message is transmitted in an uplink, and a terminal device actively activates multipath configuration information, and transmits a same RRC message to a first access network device through multipath transmission. Referring to FIG. 4, the method includes the following operations.

Operation 401: The first access network device determines first configuration information, and sends the first configuration information to the terminal device by using a first transmission path.

The first configuration information includes multipath configuration information and a first trigger condition. The multipath configuration information includes configuration information of at least one second transmission path. Each second transmission path includes a transmission link between the terminal device and one second access network device and an interface link between the first access network device and the second access network device. A second access network device on one second transmission path is different from a second access network device on another second transmission path. Configuration information of a second transmission path includes one or more of a device identifier of a second access network device, configuration information of the second access network device, resource indication information corresponding to a transmission path established between the terminal device and the second access network device, and shared context indication information. The interface link between the first access network device and the second access network device may be an X2 interface link established by using an X2 protocol.

In this embodiment of this disclosure, the terminal device activates the multipath configuration information, and transmits a same RRC message to the first access network device through multipath transmission. Only when a terminal device has a multipath transmission capability, the terminal device can perform the RRC message transmission method provided in this embodiment of this disclosure. Therefore, before this operation, the first access network device determines whether the terminal device has the multipath transmission capability. If the terminal device has the multipath transmission capability, the first access network device determines the multipath configuration information, and sends the first configuration information to the terminal device by using the first transmission path.

The operation in which the first access network device determines whether the terminal device has the multipath transmission capability may be as follows:

The terminal device sends capability indication information to the first access network device, where the capability indication information is used to indicate whether the terminal device has the multipath transmission capability; and the first access network device receives the capability indication information sent by the terminal device, and determines, based on the capability indication information, whether the terminal device has the multipath transmission capability.

For example, if the terminal device has the multipath transmission capability, the capability indication information is 1. If the terminal device does not have the multipath transmission capability, the capability indication information is 0. The first access network device receives the capability indication information sent by the terminal device. If the capability indication information is 1, the first access network device determines that the terminal device has the multipath transmission capability; or if the capability indication information is 0, the first access network device determines that the terminal device does not have the multipath transmission capability.

The operation in which the first access network device determines the multipath configuration information may be as follows:

The first access network device determines device identifiers of a plurality of second access network devices that establish interface links with the first access network device; obtains configuration information of second transmission paths based on the device identifier of each second access network device; and combines the configuration information of the second transmission paths into the multipath configuration information.

The device identifier of the second access network device may be a number, a location, or the like of the second access network device. In this embodiment of this disclosure, no specific limitation is imposed on the device identifier of the second access network device.

It should be noted that the first configuration information may include a plurality of pieces of multipath configuration information and a first trigger condition corresponding to each piece of multipath configuration information.

Operation 402: The terminal device receives the first configuration information sent by the first access network device by using the first transmission path, and stores the first configuration information.

It should be noted that, when an RRC message is transmitted through multipath transmission, the first access network device only needs to send the first configuration information to the terminal device once, and subsequently, the terminal device directly activates the multipath configuration information to transmit the RRC message. Therefore, operation 401 and operation 402 only need to be performed once. When the RRC message is subsequently transmitted, operation 401 and operation 402 do not need to be repeated, and operation 403 is directly performed.

After the terminal device stores the first configuration information, the terminal device determines whether a radio link between the terminal device and the first access network device meets the first trigger condition. When the radio link between the terminal device and the first access network device meets the first trigger condition, operation 403 is performed.

Operation 403: When the radio link between the terminal device and the first access network device meets the first trigger condition, the terminal device selects configuration information of at least one second target transmission path from the multipath configuration information.

The first trigger condition may include at least one of the following conditions:

reference signal received power (Reference Signal Received Power, RSRP) that is measured by the terminal device and that is between the terminal device and the first access network device is not greater than a first preset value;

reference signal received quality (Reference Signal Received Quality, RSRQ) that is measured by the terminal device and that is between the terminal device and the first access network device is not greater than a second preset value;

a channel quality indicator (Channel Quality Indicator, CQI) that is measured by the terminal device and that is of the radio link between the terminal device and the first access network device is not greater than a third preset value;

a signal to interference plus noise ratio (Signal Interference Noise Rate, SINR) measured by the terminal device is not greater than a fourth preset value;

a signal-to-noise ratio (Signal Noise Rate, SNR) measured by the terminal device is not greater than a fifth preset value;

a quantity of hybrid automatic repeat request (Hybrid Automatic Retransmission Request, HARQ) negative acknowledgements (Non ACKnowledgement, NACK) obtained by the terminal device through statistics collection is greater than a sixth preset value; and a quantity of automatic repeat request (Automatic Retransmission Request, ARQ) NACKs obtained by the terminal device through statistics collection is greater than a seventh preset value.

Each of the first preset value, the second preset value, the third preset value, the fourth preset value, the fifth preset value, the sixth preset value, and the seventh preset value may be set and changed as required. In this embodiment of this disclosure, no specific limitation is imposed on each of the first preset value, the second preset value, the third preset value, the fourth preset value, the fifth preset value, the sixth preset value, and the seventh preset value.

When the terminal device selects the configuration information of the at least one second target transmission path from the multipath configuration information, the terminal device may select the configuration information of the at least one second target transmission path from the multipath configuration information based on a transmission requirement of the terminal device and transmission quality of each second transmission path. This is the following first implementation. That the first access network device may alternatively indicate a to-be-activated second target transmission path to the terminal device is the following second implementation.

In the first implementation, the operation in which the terminal device selects configuration information of at least one second target transmission path from the multipath configuration information may be implemented by using the following operations 4031 to 4033 that include the following:

Operation 4031: The terminal device obtains the transmission requirement of the terminal device, where the transmission requirement includes at least one of a transmission data volume, a feedback mechanism, and a quality requirement.

The transmission requirement may include one or more of the transmission data volume, the feedback mechanism, and the quality requirement. In this embodiment of this disclosure, no specific limitation is imposed on the transmission requirement. The feedback mechanism may be an automatic repeat request ARQ protocol, forward error correction (Forward Error Correction, FEC), a HARQ, or the like. The quality requirement may be a quality of service (Quality of Service, QoS) value required for transmitting an RRC message.

Operation 4032: The terminal device determines, based on the transmission requirement, a quantity of second access network devices required by the terminal device.

The terminal device stores a correspondence between a transmission requirement and a quantity of access network devices. Correspondingly, this operation may be as follows:

The terminal device determines, based on the transmission requirement from the correspondence between a transmission requirement and a quantity of access network devices, the quantity of second access network devices required by the terminal device.

When the transmission requirement includes the transmission data volume, the terminal device stores a correspondence between a transmission data volume and a quantity of access network devices. Correspondingly, this operation may be as follows:

The terminal device determines, based on the transmission data volume from the correspondence between a transmission data volume and a quantity of access network devices, the quantity of second access network devices required by the terminal device.

For example, when the transmission data volume is 5 M, the quantity of second access network devices required by the terminal device is 1; or when the transmission data volume is 1 G, the quantity of second access network devices required by the terminal device is 3.

In this operation, to reduce memory occupied by the correspondence between a transmission data volume and a quantity of access network devices, the terminal device may not store the correspondence between a transmission data volume and a quantity of access network devices, and but stores a correspondence between a transmission data volume range and a quantity of access network devices. Correspondingly, this operation may be as follows:

The terminal device determines, based on the transmission data volume, a transmission data volume range in which the transmission data volume falls, and determining, based on the transmission data volume range from the correspondence between a transmission data volume range and a quantity of access network devices, the quantity of second access network devices required by the terminal device.

When the transmission requirement is the feedback mechanism, the terminal device stores a correspondence between a feedback mechanism and a quantity of access network devices. Correspondingly, this operation may be as follows:

The terminal device determines, based on the feedback mechanism from the correspondence between a feedback mechanism and a quantity of access network devices, the quantity of second access network devices required by the terminal device.

For example, when the feedback mechanism is the ARQ, the quantity of second access network devices required by the terminal device is 3; when the feedback mechanism is the FEC, the quantity of second access network devices required by the terminal device is 1; or when the feedback mechanism is the HARQ, the quantity of second access network devices required by the terminal device is 2.

When the transmission requirement is the quality requirement, the terminal device stores a correspondence between a QoS value and a quantity of access network devices. Correspondingly, this operation may be as follows:

The terminal device determines, from the correspondence between a QoS value and a quantity of access network devices based on a QoS value required by the terminal device, the quantity of second access network devices required by the terminal device.

For example, when the QoS value required by the terminal device is 10, the quantity of second access network devices required by the terminal device is 2; or when the QoS value required by the terminal device is 20, the quantity of second access network devices required by the terminal device is 4.

It should be noted that in this operation, the terminal device may not determine, based on the transmission requirement, the quantity of second access network devices required by the terminal device. Instead, the first access network device notifies the terminal device of the quantity of second access network devices required by the terminal device. In this case, operation 3031 and operation 3032 may be replaced with the following:

The first access network device determines a quantity of second access network devices required by the terminal device, and transmits the quantity to the terminal device; and the terminal device receives the quantity transmitted by the first access network device.

The operation in which the first access network device determines a quantity of second access network devices required by the terminal device may be as follows:

The first access network device determines, based on the transmission requirement of the terminal device, the quantity of second access network devices required by the terminal device, where this operation is the same as the implementation in which the terminal device determines, based on the transmission requirement, a quantity of second access network devices required by the terminal device, and details are not described herein again; or the first access network device may configure, in advance, the quantity of second access network devices required by the terminal device, and directly obtain the configured quantity of second access network devices required by the terminal device; or the first access network device determines, based on quality information of the radio link between the terminal device and the first access network device, the quantity of second access network devices required by the terminal device.

The quality information includes one or more of the RSRP, the RSRQ, the CQI, the SINR, the SNR, the HARQ NACK, and the ARQ NACK.

Operation 4033: The terminal device selects configuration information of second target access network devices of the quantity from the multipath configuration information.

In this operation, the terminal device may randomly select the configuration information of the second target access network devices of the quantity from the multipath configuration information. To further improve RRC message transmission reliability, in this operation, the terminal device may further select the configuration information of the second target access network devices of the quantity from the multipath configuration information based on transmission quality of each second access network device in the multipath configuration information. This may be specifically implemented by using the following operations 4033-1 and 4033-2 that include the following:

Operation 4033-1: The terminal device determines the transmission quality of each second access network device in the multipath configuration information.

That the terminal device determines the transmission quality of each second access network device includes: determining the transmission quality of each second access network device based on a quality parameter of the second access network device.

The transmission quality parameter includes one or more of a packet loss rate, a transmission latency, RSRP, RSRQ, a CQI, an SINR, an SNR, a HARQ NACK, and an ARQ NACK. If the quality parameter such as the packet loss rate, the transmission latency, the HARQ NACK, and the ARQ NACK is larger, the transmission quality is poorer. If the quality parameter such as the packet loss rate, the transmission latency, the HARQ NACK, and the ARQ NACK is smaller, the transmission quality is better. If the quality parameter such as the RSRP, the RSRQ, the CQI, the SINR, and the SNR is larger, the transmission quality is better. If the quality parameter such as the RSRP, the RSRQ, the CQI, the SINR, and the SNR is smaller, the transmission quality is poorer. Therefore, for ease of calculation, the packet loss rate, the transmission latency, the HARQ NACK, and the ARQ NACK are referred to as first-type quality parameters, and the RSRP, the RSRQ, the CQI, the SINR, and the SNR are referred to as second-type quality parameters. Correspondingly, the operation in which the terminal device determines the transmission quality of each second access network device based on a quality parameter of the second access network device may be as follows:

The terminal device determines a sum of parameter values of the second-type quality parameters of each second access network device, to obtain a first parameter value; determines a sum of parameter values of the first-type quality parameters, to obtain a second parameter value; and determines a difference between the first parameter value and the second parameter value as the transmission quality of each second access network device.

Operation 4033-2: The terminal device selects, from the multipath configuration information based on the transmission quality of each second access network device in the multipath configuration information, configuration information of second target access network devices that are of the quantity and that have best transmission quality.

The terminal device selects, from the multipath configuration information based on the transmission quality of each second access network device in the multipath configuration information, configuration information of second access network devices that are of the quantity and that have best transmission quality, and the selected second access network devices are referred to as second target access network devices.

In the second implementation, the operation in which the terminal device selects configuration information of at least one second target transmission path from the multipath configuration information may be implemented by using the following operations (A) and (B) that include the following:

Operation (A): The terminal device receives a path identifier that is of each second target transmission path and that is sent by the first access network device.

The first access network device determines transmission quality of each second transmission path in the multipath configuration information; determines the at least one second target transmission path based on the transmission quality of each second transmission path; and sends the path identifier of each second target transmission path to the terminal device. The terminal device receives the path identifier that is of each second target transmission path and that is sent by the first access network device.

The path identifier of the second target transmission path may be a name, a number, a pattern (pattern), or an index (index) of the second target transmission path. In addition, the first access network device may alternatively add the path identifier of each second target transmission path into any piece of information. For example, if the terminal device adds the path identifier of each second target transmission path into first indication information, this operation may be as follows:

The first access network device sends the first indication information to the terminal device, where the first indication information is used to indicate the path identifier of each to-be-activated second target transmission path to the terminal device. The terminal device receives the first indication information sent by the first access network device, and determines the path identifier of each second target transmission path based on the first indication information.

For example, if the first access network device sends path identifiers of two second target transmission paths to the terminal device, the first access network device may indicate the path identifier of each second target transmission path by using a 1-bit pattern, where 0 and 1 are respectively used to indicate the path identifiers of the two second target transmission paths.

For another example, if the first access network device sends path identifiers of four second target transmission paths to the terminal device, the first access network device may indicate the path identifier of each second target transmission path by using a 2-bit pattern, where 00, 01, 10, and 11 are respectively used to indicate the path identifiers of the four second target transmission paths.

To reduce bit overheads, the first access network device may use an index for representation based on different choices (choices) in the first indication information.

Operation (B): The terminal device selects configuration information of each second target transmission path from the multipath configuration information based on the path identifier of the second target transmission path.

It should be noted that, if the first configuration information includes a plurality of pieces of multipath configuration information and a first trigger condition corresponding to each piece of multipath configuration information, in this operation, when determining a first trigger condition that is met by the radio link between the terminal device and the first access network device, the terminal device activates multipath configuration information corresponding to the first trigger condition. Alternatively, the first access network device may indicate a to-be-activated set of multipath configuration information to the terminal device.

Operation 404: The terminal device establishes a second target transmission path with each second target access network device based on configuration information of each second target transmission path.

For each second target access network device, a second target transmission path corresponding to the second target access network device includes a transmission path between the second target access network device and the terminal device and an interface link between the second target transmission path and the first access network device. Correspondingly, this operation may be as follows:

For each second target access network device, the terminal device sends configuration information of the second target transmission path to the second target access network device; and the second target access network device receives the configuration information that is of the second target transmission path and that is sent by the terminal device, and respectively establishes a transmission path with the terminal device and an interface link with the first access network device based on the configuration information of the second target transmission path.

Operation 405: The terminal device transmits an RRC message to the first access network device by using the first transmission path, and transmits the same RRC message to each second target access network device by using each second target transmission path.

Operation 405a: The terminal device transmits the RRC message to the first access network device by using the first transmission path.

Operation 405b: The terminal device transmits the same RRC message to each second target access network device by using each second target transmission path.

Operation 406: Each second target access network device receives the same RRC message transmitted by the terminal device by using each second target transmission path, and forwards the same RRC message to the first access network device by using each target interface link.

The first access network device receives the RRC message transmitted by the terminal device by using the first transmission path, and receives the same RRC message forwarded by each second target access device by using each target interface link.

It should be noted that, data between the terminal device and the first access network device is all transmitted by using the first transmission path, and data between the terminal device and the second target access network device is all transmitted by using the second target transmission path.

In this embodiment of this disclosure, when an RRC message is transmitted in the uplink, the first access network device sends the multipath configuration information and the first trigger condition to the terminal device. When the terminal device detects that the radio link between the terminal device and the first access network device meets the first trigger condition, the terminal device activates the multipath configuration information, and transmits the same RRC message to the first access network device by using the first transmission path and the at least one second target transmission path. Because the same RRC message is transmitted to the first access network device by using a plurality of transmission paths, RRC message reliability is improved.

Figure 5:
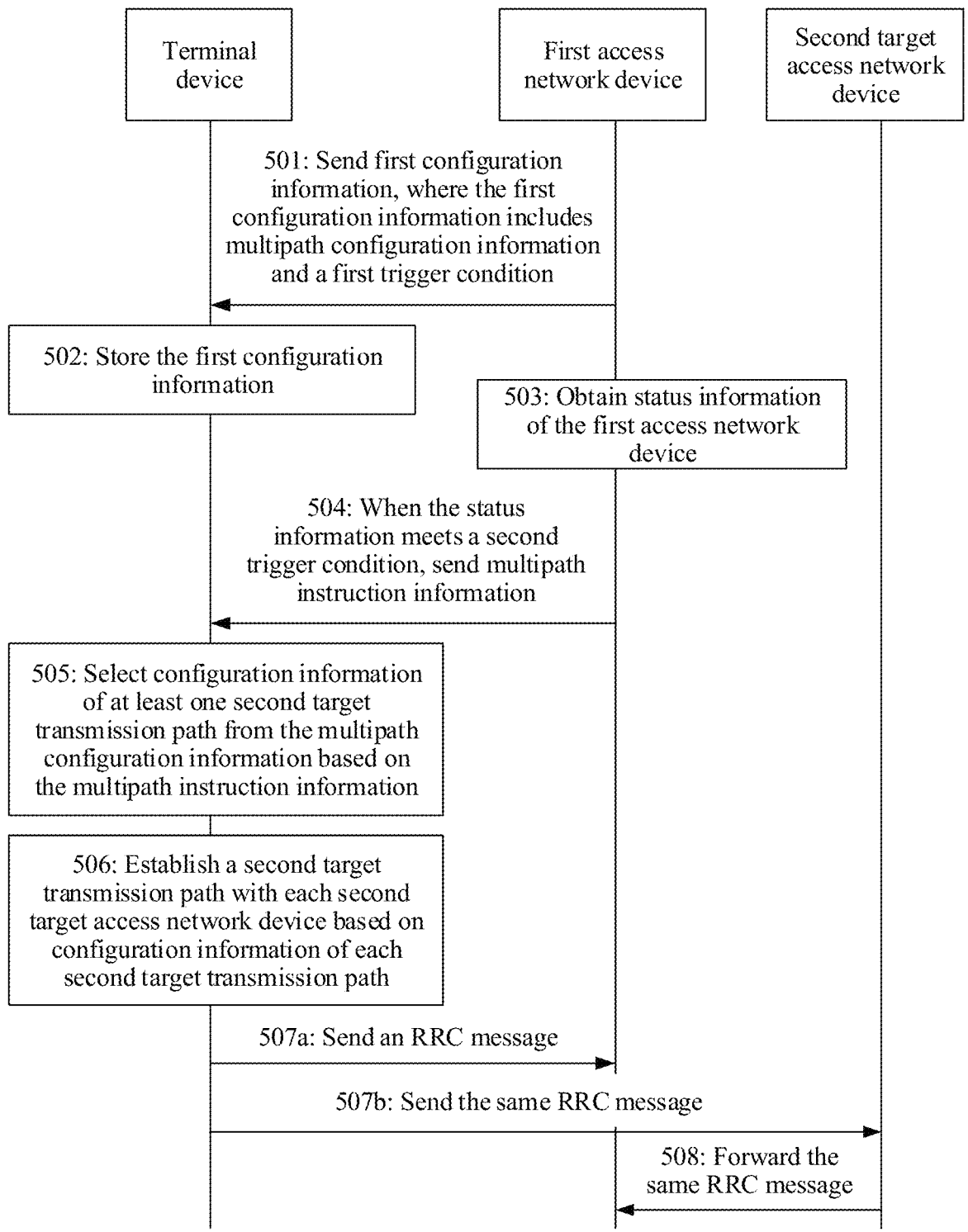
FIG. 5 is a signaling interaction diagram of another type of RRC message transmission according to an embodiment of this disclosure.

An embodiment of this disclosure provides an RRC message transmission method. In this embodiment of this disclosure, the following example is used for description: An RRC message is transmitted in an uplink, and a first access network device instructs a terminal device to activate multipath configuration information and transmit a same RRC message to the first access network device through multipath transmission. Referring to FIG. 5, the method includes the following operations.

Operation 501: The first access network device determines first configuration information, and sends the first configuration information to the terminal device by using a first transmission path.

This operation is the same as operation 401. Details are not described herein again.

Operation 502: The terminal device receives the first configuration information sent by the first access network device by using the first transmission path, and stores the first configuration information.

This operation is the same as operation 402. Details are not described herein again. Operation 503: The first access network device obtains status information of the first access network device, where the status information includes at least one type of remaining-resource information, load information, and quality information.

Before or when the terminal device transmits an RRC message to the first access network device, the first access network device may instruct, in case of a relatively small quantity of remaining resources, relatively high load, or relatively poor quality of a radio link between the first access network device and the terminal device, the terminal device to activate multipath configuration information. Therefore, the status information may include one or more of the remaining-resource information, the load information, and the quality information. The remaining-resource information may be a quantity of remaining resource blocks (Resource Block, RB). The load information may be a quantity of terminals or a quantity of established first transmission paths. The quality information is quality information of the radio link between the first access network device and the terminal device, and the quality information includes one or more of RSRP, RSRQ, a CQI, an SINR, an SNR, a HARQ NACK, and an ARQ NACK.

Operation 504: When the status information meets a second trigger condition, the first access network device sends multipath instruction information to the terminal device.

The second trigger condition includes at least one of a remaining-resource threshold, a load threshold, and a quality threshold, that is, the second trigger condition includes one or more of the remaining-resource threshold, the load threshold, and the quality threshold. When the status information includes the remaining-resource information, the second trigger condition includes the remaining-resource threshold; when the status information includes the load information, the second trigger condition includes the load threshold; or when the status information includes the quality information, the second trigger condition includes the quality threshold. Correspondingly, the second trigger condition may include at least one of the following conditions:

a current quantity of remaining RBs of the first access network device is not greater than an eighth preset value;

a quantity of accessed terminal devices of the first access network device is greater than a ninth preset value;

a quantity of established first transmission paths of the first access network device is greater than a tenth preset value;

RSRP between the first access network device and the terminal device is not greater than an eleventh preset value;

RSRQ between the first access network device and the terminal device is not greater than a twelfth preset value;

a CQI of the radio link between the first access network device and the terminal device is not greater than a thirteenth preset value;

an SINR of the first access network device is not greater than a fourteenth preset value;

an SNR of the first access network device is not greater than a fifteenth preset value;

a quantity of HARQ NACKs of the first access network device is greater than a sixteenth preset value; and a quantity of ARQ NACKs of the first access network device is greater than a seventeenth preset value.

It should be noted that, the first access network device may measure the RSRP, the RSRQ, the CQI, the SINR, the SNR, the HARQ NACK, and the ARQ NACK that are between the first access network device and the terminal device, or the first access network device may receive the RSRP, the RSRQ, the CQI, the SINR, the SNR, the HARQ NACK, and the ARQ NACK that are reported by the terminal device and that are between the first access network device and the terminal device. In this embodiment of this disclosure, no specific limitation is imposed on a manner in which the first access network device obtains the RSRP, the RSRQ, the CQI, the SINR, the SNR, the HARQ NACK, and the ARQ NACK that are between the first access network device and the terminal device.

Operation 505: The terminal device receives the multipath instruction information sent by the first access network device, and selects configuration information of at least one second target transmission path from the multipath configuration information based on the multipath instruction information.

The multipath instruction information is used to instruct the terminal device to activate the multipath configuration information and transmit a same RRC message to the first access network device by using the first transmission path and at least one second target transmission path in a plurality of second transmission paths.

In this embodiment of this disclosure, the first access network device may further indicate a to-be-activated second access network device to the terminal device. In this case, the multipath instruction information further includes a path identifier of each second target transmission path. If the multipath instruction information does not include the path identifier of each second target transmission path, this operation is the same as the first implementation in operation 403. If the multipath instruction information includes the path identifier of each second target transmission path, this operation is the same as the second implementation in operation 403. Details are not described herein again. Operation 506: The terminal device establishes a second target transmission path with each second target access network device based on configuration information of each second target transmission path.

This operation is the same as operation 404. Details are not described herein again.

Operation 507: The terminal device transmits an RRC message to the first access network device by using the first transmission path, and transmits the same RRC message to each second target access network device by using each second target transmission path.

Operation 507a: The terminal device transmits the RRC message to the first access network device by using the first transmission path.

Operation 507b: The terminal device transmits the same RRC message to each second target access network device by using each second target transmission path.

Operation 508: Each second target access network device receives the same RRC message transmitted by the terminal device by using each second target transmission path, and forwards the same RRC message to the first access network device by using each target interface link.

The first access network device receives the RRC message transmitted by the terminal device by using the first transmission path, and the first access network device receives the same RRC message forwarded by each second target access device by using each target interface link.

It should be noted that, data between the terminal device and the first access network device is all transmitted by using the first transmission path, and data between the terminal device and the second target access network device is all transmitted by using the second target transmission path.

In this embodiment of this disclosure, when an RRC message is transmitted in the uplink, the first access network device sends the multipath configuration information and a first trigger condition to the terminal device. When determining that the status information of the first access network device meets the second trigger condition, the first access network device sends the multipath instruction information to the terminal device. Based on the multipath instruction information, the terminal device activates the multipath configuration information, and transmits the same RRC message to the first access network device by using the first transmission path and the at least one second target transmission path. Because the same RRC message is transmitted to the first access network device by using a plurality of transmission paths, RRC message reliability is improved.

Figure 6:
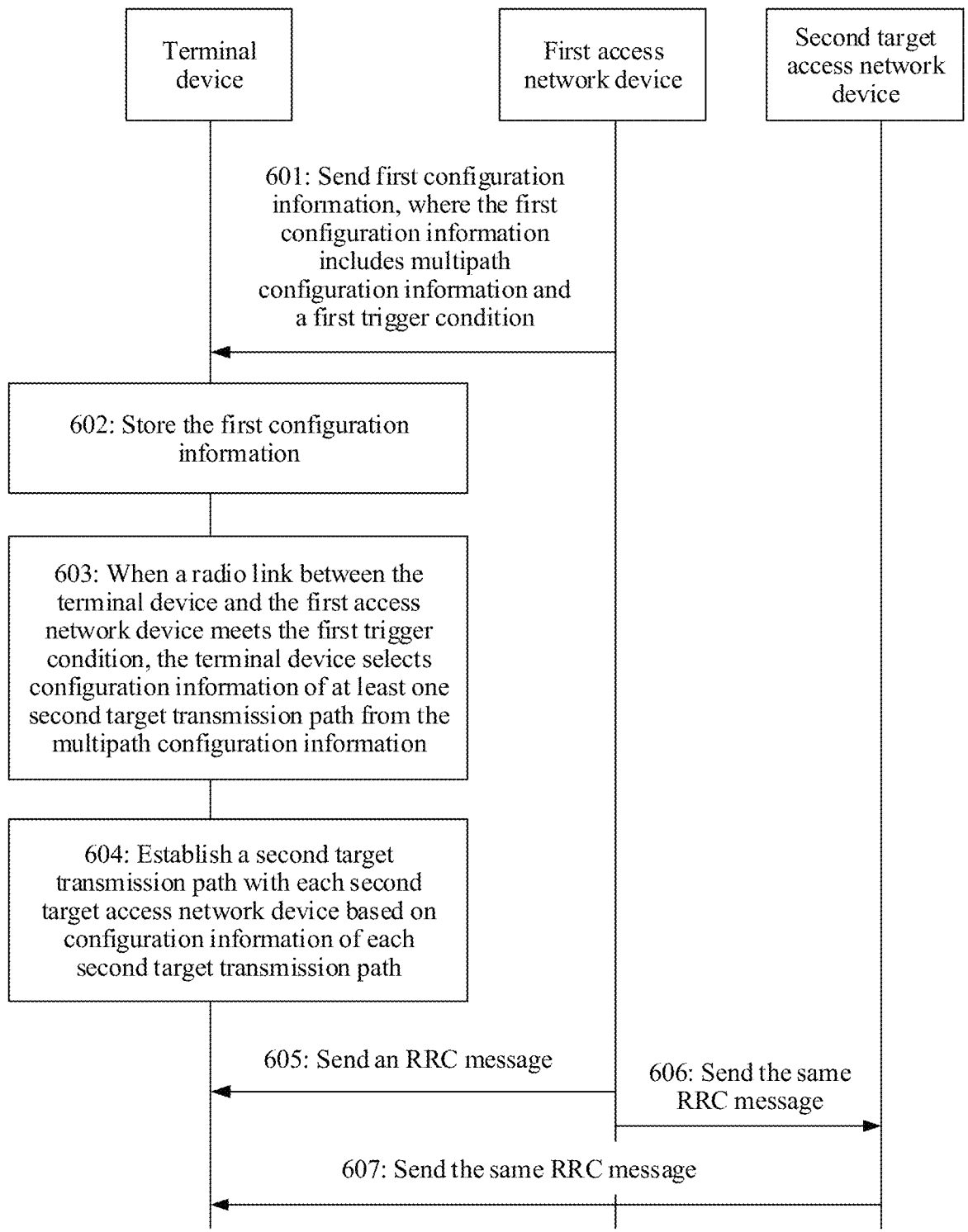
FIG. 6 is a signaling interaction diagram of another type of RRC message transmission according to an embodiment of this disclosure.

An embodiment of this disclosure provides an RRC message transmission method. In this embodiment of this disclosure, the following example is used for description: An RRC message is transmitted in a downlink, and a terminal device actively activates multipath configuration information, and receives, through multipath transmission, a same RRC message transmitted by a first access network device. Referring to FIG. 6, the method includes the following operations.

Operation 601: The first access network device determines first configuration information, and sends the first configuration information to the terminal device by using a first transmission path.

This operation is the same as operation 401. Details are not described herein again.

Operation 602: The terminal device receives the first configuration information sent by the first access network device by using the first transmission path, and stores the first configuration information.

This operation is the same as operation 401. Details are not described herein again.

Operation 603: When a radio link between the terminal device and the first access network device meets a first trigger condition, the terminal device selects configuration information of at least one second target transmission path from the multipath configuration information.

This operation is the same as operation 401. Details are not described herein again.

Operation 604: The terminal device establishes a second target transmission path with each second target access network device based on configuration information of each second target transmission path.

This operation is the same as operation 401. Details are not described herein again.

Operation 605: The first access network device transmits an RRC message to the terminal device by using the first transmission path.

Operation 606: The first access network device transmits the same RRC message to each second target access network device by using a target interface link between the first access network device and the second target access network device.

Operation 607: Each second target access network device transmits the same RRC message to the terminal device by using a transmission path between the second target access network device and the terminal device.

The terminal device receives the RRC message transmitted by the first access network device by using the first transmission path, and receives, by using a second transmission path, the same RRC message transmitted by each second target access network device.

It should be noted that the RRC message transmitted in the downlink is generated by the first access network device.

In this embodiment of this disclosure, when an RRC message is transmitted in the downlink, the first access network device sends the multipath configuration information and the first trigger condition to the terminal device. When the terminal device detects that the radio link between the terminal device and the first access network device meets the first trigger condition, the terminal device activates the multipath configuration information, and receives, by using the first transmission path and the at least one second target transmission path, the same RRC message transmitted by the first access network device. Because the same RRC message transmitted by the first access network device is received by using a plurality of transmission paths, RRC message reliability is improved.

Figure 7:
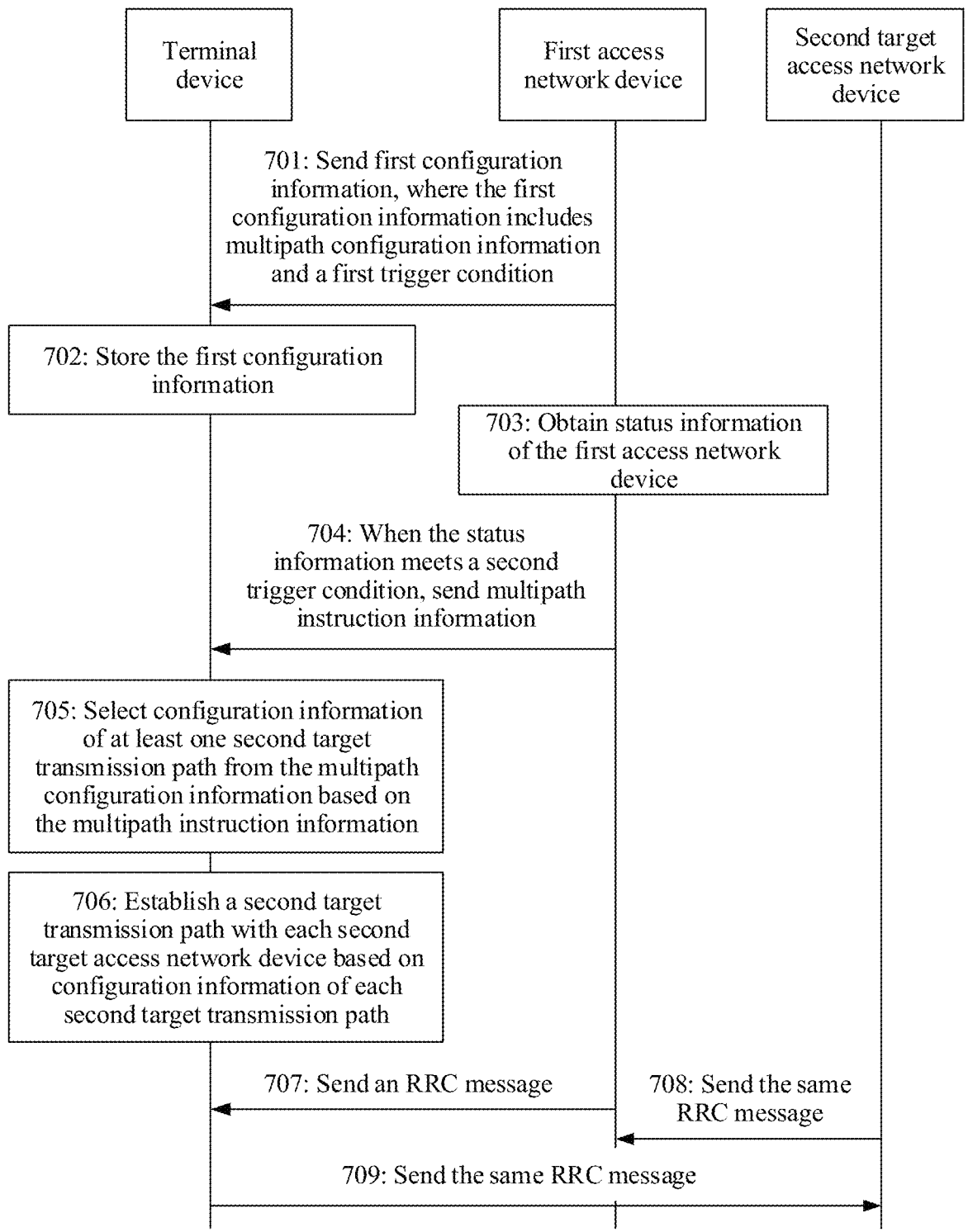
FIG. 7 is a signaling interaction diagram of another type of RRC message transmission according to an embodiment of this disclosure.

An embodiment of this disclosure provides an RRC message transmission method. In this embodiment of this disclosure, the following example is used for description: An RRC message is transmitted in a downlink, and a first access network device instructs a terminal device to activate multipath configuration information and receive, through multipath transmission, a same RRC message transmitted by the first access network device. Referring to FIG. 7, the method includes the following operations.

Operation 701: The first access network device determines first configuration information, and sends the first configuration information to the terminal device by using a first transmission path.

Operation 702: The terminal device receives the first configuration information sent by the first access network device by using the first transmission path, and stores the first configuration information.

Operation 703: The first access network device obtains status information of the first access network device, where the status information includes at least one type of remaining-resource information, load information, and quality information.

Operation 704: When the status information meets a second trigger condition, the first access network device sends multipath instruction information to the terminal device.

Operation 705: The terminal device receives the multipath instruction information sent by the first access network device, and selects configuration information of at least one second target transmission path from multipath configuration information based on the multipath instruction information.

Operation 706: The terminal device establishes a second target transmission path with each second target access network device based on configuration information of each second target transmission path.

Operation 707: The first access network device transmits an RRC message to the terminal device by using the first transmission path.

Operation 708: The first access network device transmits the same RRC message to each second target access network device by using a target interface link between the first access network device and the second target access network device.

Operation 709: Each second target access network device transmits the same RRC message to the terminal device by using a transmission path between the second target access network device and the terminal device.

The terminal device receives the RRC message transmitted by the first access network device by using the first transmission path, and receives, by using a second transmission path, the same RRC message transmitted by each second target access network device.

In this embodiment of this disclosure, when an RRC message is transmitted in the downlink, the first access network device sends the multipath configuration information and a first trigger condition to the terminal device. When determining that the status information of the first access network device meets the second trigger condition, the first access network device sends the multipath instruction information to the terminal device. Based on the multipath instruction information, the terminal device activates the multipath configuration information, and receives, by using the first transmission path and the at least one second target transmission path, the same RRC message transmitted by the first access network device. Because the same RRC message transmitted by the first access network device is received by using a plurality of transmission paths, RRC message reliability is improved.

Figure 8:
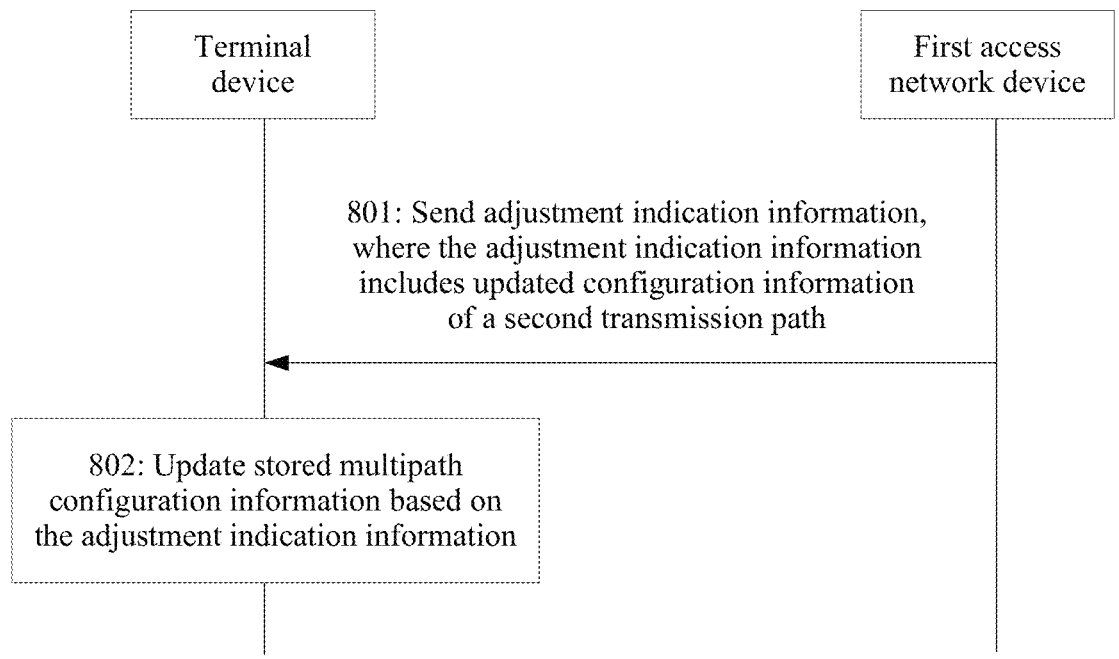
FIG. 8 is a flowchart of a method for updating multipath configuration information according to an embodiment of this disclosure.

In an embodiment of this disclosure, a first access network device configures multipath configuration information and a first trigger condition on a terminal device. The first access network device may update the multipath configuration information by using a method provided in this embodiment of this disclosure. Referring to FIG. 8, the method includes the following operations.

Operation 801: The first access network device sends adjustment indication information to the terminal device, where the adjustment indication information includes updated configuration information of a second transmission path.

The adjustment indication information may be used to add configuration information of a second transmission path into multipath configuration information, or modify configuration information of a second transmission path in multipath configuration information, or delete configuration information of a second transmission path in multipath configuration information.

If the adjustment indication information is used to add configuration information of a second transmission path into the multipath configuration information and modify configuration information of a second transmission path in the multipath configuration information, the adjustment indication information not only needs to include the updated configuration information of the second transmission path, but also needs to include an updated path identifier of the second transmission path. If the adjustment indication information is used to delete configuration information of a second transmission path in the multipath configuration information, the adjustment indication information may not include the updated configuration information of the second transmission path, but includes only an updated path identifier of the second transmission path.

If the first access network device further needs to modify a first trigger condition in the multipath configuration information, the adjustment indication information further includes an updated first trigger condition.

It should be noted that the adjustment indication information may be carried in control information. In this case, this operation may be as follows:

The first access network device sends the control information to the terminal device, where the control information includes the adjustment indication information, and the adjustment indication information includes the updated configuration information of the second transmission path.

The control information may be a physical downlink control channel (PDCCH), a media access control control element (MAC CE), or an RRC connection reconfiguration message.

It should be noted that, the first access network device may indicate the updated path identifier of the second transmission path by using a pattern in the control information, or may indicate the updated path identifier of the second transmission path by using an index based on different choices.

When the first access network device indicates the updated path identifier of the second transmission path by using the pattern in the control information, if the multipath configuration information includes configuration information of two second transmission paths, 1-bit control information may be used to indicate the updated path identifier of the second transmission path, where 0 and 1 respectively indicate a first second-transmission-path and a second second-transmission-path in the multipath configuration information.

If the multipath configuration information includes configuration information of four second transmission paths, 2-bit control information may be used to indicate the updated path identifier of the second transmission path, where 00, 01, 10, and 11 respectively indicate a first second-transmission-path, a second second-transmission-path, a third second-transmission-path, and a fourth second-transmission-path in the multipath configuration information.

If the multipath configuration information includes configuration information of more than four second transmission paths, control information of 3 bits, 4 bits, or more bits may be used to indicate the updated path identifier of the second transmission path. Operation 802: The terminal device receives the adjustment indication information sent by the first access network device, and updates the stored multipath configuration information based on the adjustment indication information.

When the adjustment indication information is used to add configuration information of a second transmission path into the multipath configuration information, the terminal device adds, into the multipath configuration information, the configuration information of the second transmission path in the adjustment indication information.

When the adjustment indication information is used to modify configuration information of a second transmission path in the multipath configuration information, the terminal device modifies the updated configuration information of the second transmission path in the multipath configuration information to the configuration information of the second transmission path in the adjustment indication information.

When the adjustment indication information is used to delete configuration information of a second transmission path in the multipath configuration information, the terminal device deletes the updated configuration information of the second transmission path in the multipath configuration information.

It should be noted that, if the adjustment indication information further includes the updated first trigger condition, the terminal device updates the stored first trigger condition based on the adjustment indication information.

In this embodiment of this disclosure, the first access network device may update, by using the adjustment indication information, the multipath configuration information stored in the terminal device, so that the multipath configuration information is updated in a timely manner. In addition, the first access network device may add the adjustment indication information into the PDCCH or the MAC CE, so that not only adjustment flexibility is increased, but also an RRC reconfiguration latency is reduced and overheads of the RRC reconfiguration message are reduced.

Figure 9:
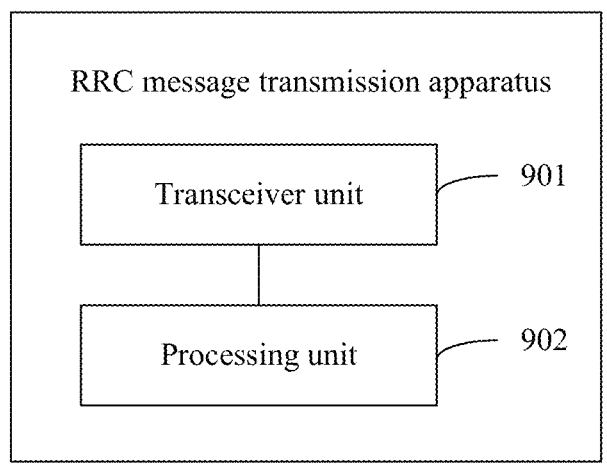
FIG. 9 is a schematic structural diagram of an RRC message transmission apparatus according to an embodiment of this disclosure.

An embodiment of this disclosure provides an RRC message transmission apparatus. The apparatus is applied to a terminal device, and is configured to perform operations performed by the foregoing terminal device. Referring to FIG. 9, the apparatus includes a transceiver unit 901 and a processing unit 902.

The transceiver unit 901 is configured to perform operation 402 of receiving the first configuration information sent by the first access network device by using the first transmission path, operation 405, operation 502, operation 505, operation 506, operation 507, operation 602, operation 605, operation 702, operation 704, operation 705 of receiving the multipath instruction information sent by the first access network device, operation 802, and an optional solution thereof.

The processing unit 902 is configured to perform operation 402 of storing the first configuration information, operation 403, operation 404, operation 603, operation 604, operation 703, operation 704 of determining whether the status information meets a second trigger condition, operation 705 of selecting configuration information of at least one second target transmission path from multipath configuration information based on the multipath instruction information, operation 706, and an optional solution thereof.

In this embodiment of this disclosure, when an RRC message is transmitted in an uplink, the first access network device sends multipath configuration information and a first trigger condition to the terminal device. When the terminal device detects that a radio link between the terminal device and the first access network device meets the first trigger condition, the terminal device activates the multipath configuration information, and transmits a same RRC message to the first access network device by using a first transmission path and at least one second target transmission path. Because the same RRC message is transmitted to the first access network device by using a plurality of transmission paths, RRC message reliability is improved.

Figure 10:
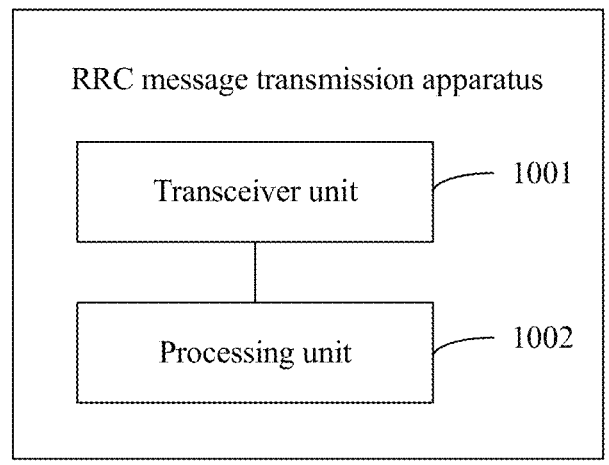
FIG. 10 is a schematic structural diagram of another RRC message transmission apparatus according to an embodiment of this disclosure.

An embodiment of this disclosure provides an RRC message transmission apparatus. The apparatus is applied to a first access network device, and is configured to perform operations performed by the foregoing access network device. Referring to FIG. 10, the apparatus includes a transceiver unit 1001 and a processing unit 1002.

The transceiver unit 1001 is configured to perform operation 401 of sending the first configuration information to the terminal device by using a first transmission path, operation 501 of sending the first configuration information to the terminal device by using a first transmission path, operation 504 of sending multipath instruction information to the terminal device, operation 601 of sending the first configuration information to the terminal device by using a first transmission path, operation 605, operation 606, operation 701 of sending the first configuration information to the terminal device by using a first transmission path, operation 707, operation 708, operation 801, and an optional solution thereof.

The processing unit 1002 is configured to perform operation 401 of determining first configuration information, operation 501 of determining first configuration information, operation 503, operation 504 of determining whether the status information meets a second trigger condition, operation 601 of determining first configuration information, operation 701 of determining first configuration information, and an optional solution thereof.

In this embodiment of this disclosure, when an RRC message is transmitted in an uplink, the first access network device sends multipath configuration information and a first trigger condition to the terminal device. When the terminal device detects that a radio link between the terminal device and the first access network device meets the first trigger condition, the terminal device activates the multipath configuration information, and transmits a same RRC message to the first access network device by using a first transmission path and at least one second target transmission path. Because the same RRC message is transmitted to the first access network device by using a plurality of transmission paths, RRC message reliability is improved.

It should be noted that, when the RRC message transmission apparatus provided in the foregoing embodiments transmits an RRC message, division of the foregoing function modules is used only as an example for description. In actual application, the foregoing functions may be allocated to different function modules and implemented as required, that is, an internal structure of a device is divided into different function modules, to implement all or some of the functions described above. In addition, the RRC message transmission apparatus provided in the foregoing embodiments and the RRC message transmission method embodiments belong to a same concept. For a specific implementation process, refer to the method embodiments. Details are not described herein again.

Figure 11:
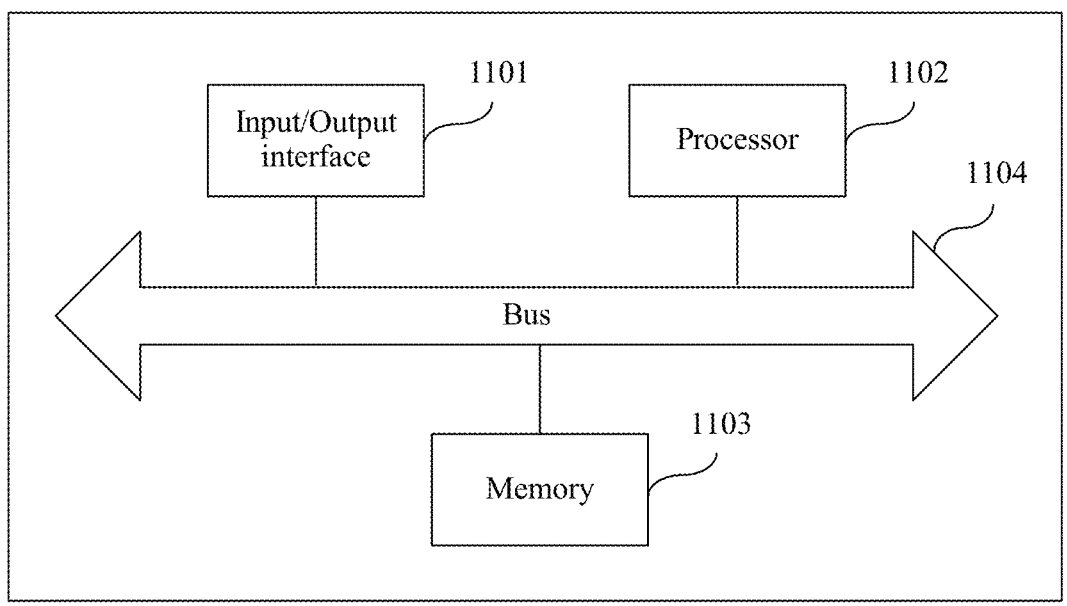
FIG. 11 is a schematic structural diagram of a system chip according to an embodiment of this disclosure.

An embodiment of this disclosure provides a system chip that is applied to a terminal device. Referring to FIG. 11, the system chip includes an input/output interface 1101, at least one processor 1102, a memory 1103, and a bus 1104. The input/output interface 1101 is connected to the at least one processor 1102 and the memory 1103 by using the bus 1104. The input/output interface 1101 is used by the terminal device to communicate with a first access network device and a second access network device. The at least one processor 1102 executes an instruction stored in the memory 1103, so that the terminal device performs the foregoing RRC message transmission method.

Figure 12:
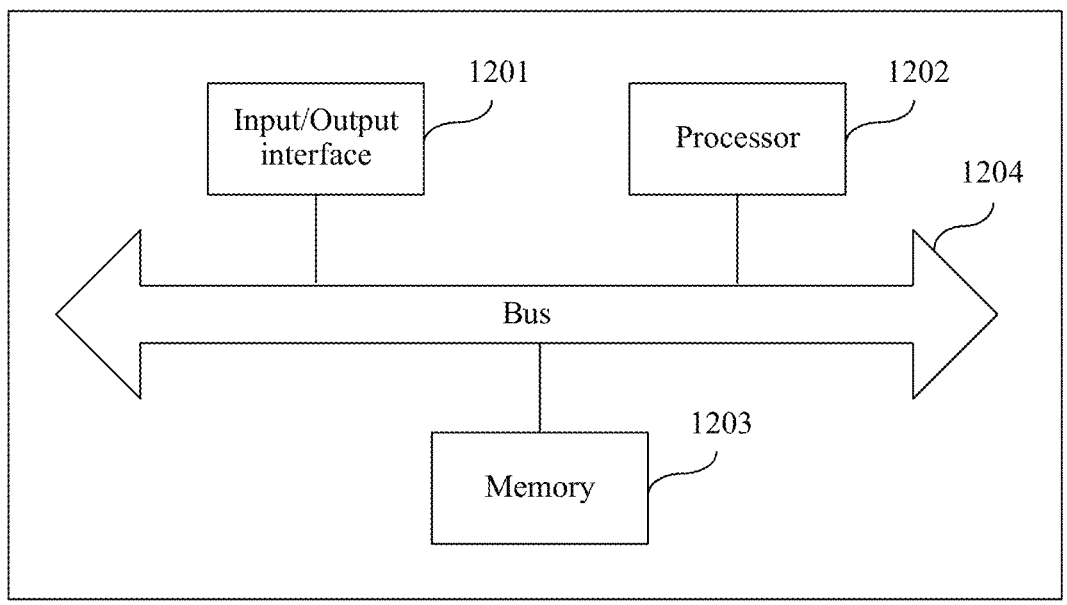
FIG. 12 is a schematic structural diagram of another system chip according to an embodiment of this disclosure.

An embodiment of this disclosure provides a system chip that is applied to a first access network device. Referring to FIG. 12, the system chip includes an input/output interface 1201, at least one processor 1202, a memory 1203, and a bus 1204. The input/output interface 1201 is connected to the at least one processor 1202 and the memory 1203 by using the bus 1204. The input/output interface 1201 is used by a terminal device to communicate with the first access network device and a second access network device. The at least one processor 1202 executes an instruction stored in the memory 1203, so that the first access network device performs the foregoing RRC message transmission method.

The term "and/or" in this disclosure describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may understand that all or some of the operations of the embodiments may be implemented by hardware or a program instructing related hardware. The program may be stored in a computer readable storage medium. The storage medium may include: a read-only memory, a magnetic disk, or an optical disc.

The foregoing descriptions are merely alternative embodiments of this disclosure, but are not intended to limit this disclosure. Any modification, equivalent replacement, or improvement made without departing from the spirit and principle of this disclosure should fall within the protection scope of this disclosure.

All of the foregoing optional technical solutions may be randomly combined to form optional embodiments of this disclosure. Details are not described herein.

What is claimed is:

1. A radio resource control (RRC) message transmission method, comprising:
receiving, by a terminal device, first configuration information sent by a first access network device by using a first transmission path, wherein the first configuration information comprises multipath configuration information and a first trigger condition, the multipath configuration information comprises configuration information of a plurality of second transmission paths, each second transmission path comprises a transmission link between the terminal device and one second access network device and an interface link between the first access network device and the second access network device, and a second access network device on one second transmission path is different from a second access network device on another second transmission path; and
when a radio link between the terminal device and the first access network device meets the first trigger condition, activating, by the terminal device, the multipath configuration information, and transmitting a same-RRC message to the first access network device by using the first transmission path and at least one second target transmission path in the plurality of second transmission paths, wherein the RRC message is generated by the terminal device.

2. The method according to claim 1, wherein the first trigger condition comprises at least one of conditions:
reference signal received power (RSRP) that is measured by the terminal device and that is between the terminal device and the first access network device is not greater than a first preset value;
reference signal received quality (RSRQ) that is measured by the terminal device and that is between the terminal device and the first access network device is not greater than a second preset value;
a channel quality indicator (CQI) that is measured by the terminal device and that is of the radio link between the terminal device and the first access network device is not greater than a third preset value;
a signal to interference plus noise ratio (SINR) measured by the terminal device is not greater than a fourth preset value;
a signal-to-noise ratio (SNR) measured by the terminal device is not greater than a fifth preset value;
a quantity of hybrid automatic repeat request (HARQ) negative acknowledgements (NACKs) obtained by the terminal device through statistics collection is greater than a sixth preset value; or
a quantity of automatic repeat request (ARQ) negative acknowledgements (NACKs) obtained by the terminal device through statistics collection is greater than a seventh preset value.

3. The method according to claim 1, further comprising:
receiving, by the terminal device, multipath instruction information sent by the first access network device; and
performing, by the terminal device based on the multipath instruction information, operation activating the multipath configuration information, and transmitting a same radio resource control RRC message to the first access network device by using the first transmission path and at least one second target transmission path in the plurality of second transmission paths.

4. The method according to claim 1, wherein the activating, by the terminal device, the multipath configuration information, and transmitting a same RRC message to the first access network device by using the first transmission path and at least one second target transmission path in the plurality of second transmission paths comprises:
selecting, by the terminal device, configuration information of the at least one second target transmission path from the multipath configuration information;
establishing, by the terminal device, a second target transmission path with each second target access network device based on configuration information of each second target transmission path; and
transmitting, by the terminal device, the RRC message to the first access network device by using the first transmission path, and transmitting the same RRC message to each second target access network device by using each second target transmission path, wherein the RRC message is used by each second target access network device to forward the same RRC message to the first access network device by using each target interface link.

5. The method according to claim 4, wherein the selecting, by the terminal device, configuration information of the at least one second target transmission path from the multipath configuration information comprises:
obtaining, by the terminal device, a transmission requirement of the terminal device, wherein the transmission requirement comprises at least one of a transmission data volume, a feedback mechanism, or a quality requirement;
determining, by the terminal device based on the transmission requirement, a quantity of second access network devices required by the terminal device; and
selecting, by the terminal device, configuration information of second target access network devices of the quantity from the multipath configuration information.

6. The method according to claim 5, wherein the determining, by the terminal device based on the transmission requirement, a quantity of second access network devices required by the terminal device comprises:
determining, by the terminal device based on the transmission requirement from a correspondence between a transmission requirement and a quantity of access network devices, the quantity of second access network devices required by the terminal device.

7. The method according to claim 5, wherein the selecting, by the terminal device, configuration information of second target access network devices of the quantity from the multipath configuration information comprises:
determining, by the terminal device, transmission quality of each second access network device in the multipath configuration information; and
selecting, by the terminal device from the multipath configuration information based on the transmission quality of each second access network device in the multipath configuration information, configuration information of second target access network devices that are of the quantity and that have best transmission quality.

8. The method according to claim 4, wherein the selecting, by the terminal device, configuration information of the at least one second target transmission path from the multipath configuration information comprises:
  receiving, by the terminal device, a path identifier that is of each second target transmission path and that is sent by the first access network device; and
  selecting, by the terminal device, configuration information of each second target transmission path from the multipath configuration information based on the path identifier of the second target transmission path.

9. The method according to claim 1 further comprising:
  receiving, by the terminal device, adjustment indication information sent by the first access network device, wherein the adjustment indication information comprises updated configuration information of a second transmission path; and
  updating, by the terminal device, the multipath configuration information based on the adjustment indication information.

10. The method according to claim 9, wherein the receiving, by the terminal device, adjustment indication information sent by the first access network device comprises:
  receiving, by the terminal device, control information sent by the first access network device, wherein the control information comprises the adjustment indication information, and the control information is a physical downlink control channel (PDCCH), a media access control control element (MAC CE), or an RRC connection reconfiguration message.

11. A radio resource control (RRC) message transmission apparatus, comprising:
  a transceiver, configured to receive first configuration information sent by a first access network device by using a first transmission path, wherein the first configuration information comprises multipath configuration information and a first trigger condition, the multipath configuration information comprises configuration information of a plurality of second transmission paths, each second transmission path comprises a transmission link between a terminal device and one second access network device and an interface link between the first access network device and the second access network device, and a second access network device on one second transmission path is different from a second access network device on another second transmission path; and
  a processor, configured to: when a radio link between the terminal device and the first access network device meets the first trigger condition, activate the multipath configuration information, and control the transceiver to transmit a same RRC message to the first access network device by using the first transmission path and at least one second target transmission path in the plurality of second transmission paths, wherein the RRC message is generated by the terminal device.

12. The apparatus according to claim 11, wherein the first trigger condition comprises at least one of conditions:
  reference signal received power (RSRP) that is measured by the terminal device and that is between the terminal device and the first access network device is not greater than a first preset value;
  reference signal received quality (RSRQ) that is measured by the terminal device and that is between the terminal device and the first access network device is not greater than a second preset value;
  a channel quality indicator (CQI) that is measured by the terminal device and that is of the radio link between the terminal device and the first access network device is not greater than a third preset value;
  a signal to interference plus noise ratio (SINR) measured by the terminal device is not greater than a fourth preset value;
  a signal-to-noise ratio (SNR) measured by the terminal device is not greater than a fifth preset value;
  a quantity of hybrid automatic repeat request (HARQ) negative acknowledgements (NACKs) obtained by the terminal device through statistics collection is greater than a sixth preset value; or
  a quantity of automatic repeat request (ARQ) negative acknowledgements (NACKs) obtained by the terminal device through statistics collection is greater than a seventh preset value.

13. The apparatus according to claim 11, wherein
  the transceiver is further configured to receive multipath instruction information sent by the first access network device; and
  the processor is further configured to perform, based on the multipath instruction information, operation activate the multipath configuration information, and control the transceiver to transmit a same RRC message to the first access network device by using the first transmission path and at least one second target transmission path in the plurality of second transmission paths.

14. The apparatus according to claim 11, wherein
  the processor is further configured to select configuration information of the at least one second target transmission path from the multipath configuration information;
  the processor is further configured to establish a second target transmission path with each second target access network device based on configuration information of each second target transmission path; and
  the transceiver is further configured to: transmit the RRC message to the first access network device by using the first transmission path, and transmit the same RRC message to each second target access network device by using each second target transmission path, wherein the RRC message is used by each second target access network device to forward the same RRC message to the first access network device by using each target interface link.

15. The apparatus according to claim 11, wherein
  the processor is further configured to: obtain a transmission requirement of the terminal device, wherein the transmission requirement comprises at least one of a transmission data volume, a feedback mechanism, and a quality requirement; determine, based on the transmission requirement, a quantity of second access network devices required by the terminal device; and select configuration information of second target access network devices of the quantity from the multipath configuration information.

16. The apparatus according to claim 15, wherein that the processor is further configured to determine, based on the transmission requirement, a quantity of second access network devices required by the terminal device comprises:
  determine, based on the transmission requirement from a correspondence between a transmission requirement and a quantity of access network devices, the quantity of second access network devices required by the terminal device.

17. The apparatus according to claim 11 further comprising:
- the transceiver is further configured to receive adjustment indication information sent by the first access network device, wherein the adjustment indication information comprises updated configuration information of a second transmission path; and
- the processor is further configured to update the multipath configuration information based on the adjustment indication information.

18. A radio resource control (RRC) message transmission apparatus, comprising:
- a processor, configured to determine first configuration information, wherein the first configuration information comprises multipath configuration information and a first trigger condition, the multipath configuration information comprises configuration information of a plurality of second transmission paths, each second transmission path comprises a transmission link between a terminal device and one second access network device and an interface link between a first access network device and the second access network device, and a second access network device on one second transmission path is different from a second access network device on another second transmission path; and
- a transceiver, configured to send the first configuration information to the terminal device by using a first transmission path, wherein
- the transceiver is further configured to: receive an RRC message transmitted by the terminal device by using the first transmission path, and receive the same RRC message transmitted by at least one second target access network device by using at least one target interface link, wherein the RRC message is generated by the terminal device, and the RRC message is sent by the terminal device when it is determined that a radio link between the terminal device and the first access network device meets the first trigger condition.

19. The apparatus according to claim 18, wherein
- the processor is further configured to obtain status information of the first access network device, wherein the status information comprises at least one type of remaining-resource information, load information, and quality information; and
- the transceiver is further configured to: when the status information meets a second trigger condition, send multipath instruction information to the terminal device, wherein the multipath instruction information is used to instruct the terminal device to transmit the same RRC message to the first access network device by using the first transmission path and at least one second target transmission path.

20. The apparatus according to claim 18, wherein
- the transceiver is further configured to send adjustment indication information to the terminal device, wherein the adjustment indication information comprises updated configuration information of a second transmission path, and the adjustment indication information is used by the terminal device to update the multipath configuration information based on the adjustment indication information.

\* \* \* \* \*